United States Patent
Liu et al.

(10) Patent No.: US 11,671,931 B2
(45) Date of Patent: Jun. 6, 2023

(54) METHOD AND APPARATUS FOR IMPLEMENTING NETWORK SYNCHRONIZATION

(71) Applicant: Huawei Technologies Co., Ltd., Shenzhen (CN)

(72) Inventors: Fengwei Liu, Chengdu (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/094,341

(22) Filed: Nov. 10, 2020

(65) Prior Publication Data
US 2021/0058884 A1    Feb. 25, 2021

Related U.S. Application Data

(63) Continuation of application No. PCT/CN2019/081675, filed on Apr. 8, 2019.

(30) Foreign Application Priority Data

May 11, 2018   (CN) .......................... 201810450678.8

(51) Int. Cl.
*H04W 56/00*    (2009.01)
*H04W 84/04*    (2009.01)

(52) U.S. Cl.
CPC ... *H04W 56/0045* (2013.01); *H04W 56/0015* (2013.01); *H04W 84/047* (2013.01)

(58) Field of Classification Search
CPC ........... H04W 56/0045; H04W 56/001; H04W 56/00; H04W 56/0015; H04W 84/047; H04J 3/06; H04J 3/0602; H04J 3/0638
See application file for complete search history.

(56) References Cited

U.S. PATENT DOCUMENTS

2014/0098798 A1* 4/2014 Khandekar ....... H04W 56/0005
                                                                370/336
2015/0117295 A1* 4/2015 Yeh ........................ H04L 5/0048
                                                                370/312
(Continued)

FOREIGN PATENT DOCUMENTS

CN          102036364 A       4/2011
CN          102083195 A       6/2011
(Continued)

OTHER PUBLICATIONS

Qualcomm Inc., "Timing synchronization across IAB topology", 3GPP TSG RAN WG3 Meeting #99bis R3-181947, Sanya, China, Apr. 16-20, 2018, 5 pages.

(Continued)

*Primary Examiner* — Ricardo H Castaneyra
(74) *Attorney, Agent, or Firm* — Slater Matsil, LLP

(57) ABSTRACT

A method includes: receiving, by a first node, transmission timing information sent by a second node, where the transmission timing information includes a first network timing advance; and determining, by the first node, frame timing of the first node based on the transmission timing information, where the frame timing includes a downlink frame sending time and/or an uplink frame receiving time of the first node; and the second node is an upper-level node of the first node.

16 Claims, 12 Drawing Sheets

(56) References Cited

U.S. PATENT DOCUMENTS

2017/0111908 A1* 4/2017 Xiong ............... H04W 56/0045
2018/0324882 A1* 11/2018 Gulati .................. H04W 76/14
2019/0053183 A1* 2/2019 Park ...................... H04W 76/27

FOREIGN PATENT DOCUMENTS

| | | | |
|---|---|---|---|
| CN | 102958075 A | 3/2013 | |
| EP | 2568755 A1 | 3/2013 | |
| EP | 3501186 | * 4/2018 | ............ H04W 56/00 |
| WO | 2011017846 A1 | 2/2011 | |
| WO | 2013023171 A1 | 2/2013 | |

OTHER PUBLICATIONS

3rd Generation Partnership Project;Technical Specification Group Radio Access Network; NR; Physical channels and modulation (Release 15), 3GPP TS 38.211 V15.1.0 (Mar. 2018), 87 pages.
3rd Generation Partnership Project;Technical Specification Group Radio Access Network; NR; Physical layer procedures for control (Release 15), 3GPP TS 38.213 V15.1.0 (Mar. 2018), 77 pages.
3rd Generation Partnership Project; Technical Specification Group Radio Access Network; NR; Physical layer procedures for data (Release 15), 3GPP TS 38.214 V15.1.0 (Mar. 2018), 77 pages.
3rd Generation Partnership Project; Technical Specification Group Radio Access Network; NR; Radio Resource Control (RRC) protocol specification (Release 15), 3GPP TS 38.331 V15.1.0 (Mar. 2018), 268 pages.
Alcatel-Lucent et al., "PRACH for LC-MTC", 3GPP TSG RAN WG1 Meeting #80bis R1-151234, Belgrade, Serbia, Apr. 20-24, 2015, 4 pages.
Zte Corp. et al., "WF on NB-RS for NB-IoT", 3GPP TSG RAN WG1 #84 meeting R1-161234, St. Julian, Malta, Feb. 15-19, 2016, 3 pages.
AT&T et al., "New SID Proposal: Study on Integrated Access and Backhaul for NR", 3GPP TSG RAN Meeting #78 RP-172290, Lisbon, Portugal, Dec. 18-21, 2017, 5 pages.
3rd Generation Partnership Project; Technical Specification Group Radio Access Network; NR; Requirements for support of radio resource management (Release 15), 3GPP TS 38.133 V15.1.0 (Mar. 2018), 59 pages.
3rd Generation Partnership Project; Technical Specification Group Radio Access Network; NR; Medium Access Control (MAC) protocol specification (Release 15), 3GPP TS 38.321 V15.1.0 (Mar. 2018), 67 pages.

* cited by examiner

METHOD AND APPARATUS FOR IMPLEMENTING NETWORK SYNCHRONIZATION

CROSS-REFERENCE TO RELATED APPLICATIONS

This application is a continuation of International Application No. PCT/CN2019/081675, filed on Apr. 8, 2019 which claims priority to Chinese Patent Application No. 201810450678.8, filed on May 11, 2018. The disclosures of the aforementioned applications are hereby incorporated by reference in their entireties.

TECHNICAL FIELD

The present invention relates to communications technologies, and specifically, to a method and an apparatus for implementing network synchronization in a relay network.

BACKGROUND

With continuous development of mobile communications technologies, spectrum resources become increasingly insufficient. To improve spectrum utilization, base stations will be deployed more densely in the future. In addition, dense deployment can avoid coverage holes. In a conventional cellular network architecture, a base station establishes a connection to a core network (CN) through an optical fiber. However, costs of fiber deployment are extremely high in many scenarios. A wireless relay node (RN) establishes a connection to a core network via a wireless backhaul link, so that some costs of optical fiber deployment can be reduced.

In-band relay is a relay solution in which a backhaul link and an access link share a same frequency band. Because no additional spectrum resource is used, the in-band relay has advantages such as high spectral efficiency and low deployment costs. The in-band relay generally has a half-duplex constraint. Specifically, when receiving a downlink signal sent by an upper-level node of the relay node, the relay node cannot send a downlink signal to a lower-level node of the relay node, and when receiving an uplink signal sent by the lower-level node of the relay node, the relay node cannot send an uplink signal to the upper-level node of the relay node. An in-band relay solution of new radio (NR) in a 5th generation communications system (5G) is referred to as integrated access backhaul (IAB), and a relay node is referred to as an IAB node or a relay transmission reception point (rTRP).

In NR, it is considered that IAB supports multi-level relay, that is, one relay node may access a network through another relay node. Because a subcarrier spacing supported in the multi-level relay and NR may be larger (for example, a high frequency) than that supported in long term evolution (LTE), higher timing precision is required. In a relay system, it is very important to keep synchronization between relay nodes and between a relay node and a donor base station, and synchronization precision affects performance of an entire system. How to provide more accurate frame or subframe synchronization via a wireless backhaul link to keep network synchronization between wireless relay nodes is an important problem to be considered in an IAB solution design.

SUMMARY

Embodiments of this application provide a method and an apparatus for implementing network synchronization, to resolve a network synchronization problem caused by a subframe synchronization deviation of a relay node when a timing reference signal of the relay node changes or an actual network timing advance is different from a network timing advance configured by an upper-level node.

To achieve the foregoing objective, the following technical solutions are used in the embodiments of this application.

According to a first aspect, a frame timing synchronization method is provided, where the method is applied to a wireless communications system, the wireless communications system includes a first node and a second node, the second node is an upper-level node of the first node, and the method includes: receiving, by the first node, transmission timing information sent by the second node, where the transmission timing information includes a first network timing advance; and determining, by the first node, frame timing of the first node based on the transmission timing information, where the frame timing includes a downlink frame sending time and/or an uplink frame receiving time of the first node. In the foregoing technical solution, the first node may obtain precise timing adjustment information through the transmission timing information, to adjust the frame timing of the first node, so that the first node keeps network synchronization with the second node. In this way, interference between nodes and degradation of system performance that are caused by a network synchronization deviation are avoided.

In a possible implementation of the first aspect, the transmission timing information further includes a timing offset.

In a possible implementation of the first aspect, before the receiving, by the first node, transmission timing information, the method further includes: sending, by the first node, timing capability information or a timing configuration request to the second node, where the timing capability information is used to indicate a capability of the first node to support a global positioning system, and the timing configuration request is used to request the second node to send the transmission timing information to the first node. In the foregoing technical solution, the second node can obtain an attribute of the first node, and can configure the transmission timing information for the first node in time, so that the first node can provide a service for a terminal as soon as possible.

In a possible implementation of the first aspect, when the first node detects that an absolute value of a difference between an actual network timing advance and an application timing advance is greater than a first threshold N1, the first node adjusts the frame timing based on a second threshold N2, where the second threshold N2 is predefined or configured by the second node, the second threshold N2 is used to indicate a maximum timing adjustment amount or a minimum timing adjustment amount of the first node in a unit time, and the application timing advance is determined based on the first network timing advance. In the foregoing technical solution, when the absolute value of the difference between the actual network timing advance and the application timing advance is greater than the first threshold N1, the first node may adjust the frame timing, thereby ensuring network timing synchronization between the first node and the second node.

In a possible implementation of the first aspect, when a timing reference signal of the first node is reconfigured by the second node, the first node determines a second network timing advance, and sends the second network timing advance to the second node. The second network timing advance may be used by the second node to determine a backhaul resource configuration used when sending a signal to the first node, or may be used by the second node to reconfigure the transmission timing information for the first node. In the foregoing technical solution, when the timing reference signal of the first node is reconfigured by the second node, the second node can adjust a symbol used when sending data to the first node, or adjust a network timing advance of the first node, to avoid a loss or performance deterioration of data received by the first node due to a timing problem. Signaling overheads can be reduced through the enhanced solution.

In a possible implementation of the first aspect, in a process in which an upper-level node of the first node is switched from the second node to a third node, the first node determines a third network timing advance and sends the third network timing advance to the third node, where the third node is the upper-level node of the first node. In the foregoing technical solution, the network timing advance of the first node is determined in a switching process, so that a network synchronization process is shortened, data transmission between the first node and the third node is accelerated, and a sudden timing change of the first node caused by switching of an upper-level node can be avoided.

In a possible implementation of the first aspect, the determining, by the first node, a third network timing advance and sending the third network timing advance to the third node includes: receiving, by the first node, a timing reference signal sent by the third node; determining, by the first node, the third network timing advance based on the timing reference signal sent by the third node; and sending, by the first node, the third network timing advance to the third node or to the third node through the second node. In the foregoing technical solution, the network timing advance may be determined in advance by using the timing reference signal of the third node, and the third node may determine, in advance based on the network timing advance of the first node, a backhaul resource configuration used when transmitting a signal to the first node, thereby avoiding a transmission error. In addition, a sudden timing change of the first node caused by switching of an upper-level node can be avoided.

In a possible implementation of the first aspect, the first node receives a network timing reconfiguration message sent by the second node or the third node, where the network timing reconfiguration message is used to adjust the frame timing of the first node, and the network timing reconfiguration message includes: a fourth network timing advance or a fourth network timing advance and a maximum timing adjustment amount in a unit time, or a fourth network timing advance and a minimum timing adjustment amount.

In the foregoing technical solution, network timing (frame timing) of the first node is readjusted, so that timing precision of the first node can be improved, or utilization of a symbol between the first node and an upper-level node can be increased, and spectral efficiency can be improved.

In a possible implementation of the first aspect, the first node determines a frame timing adjustment amount when a timing reference signal of the first node is reconfigured; and the first node sends, through a system message or a dedicated message, frame timing update information to a lower-level node served by the first node, where the frame timing update information includes the frame timing adjustment amount. In the foregoing technical solution, when the timing reference signal of the first node is reconfigured, the frame timing is adjusted at a time through a broadcast message and a dedicated message, a problem of an uplink sending timing advance of a terminal is resolved, and a system design is simplified. Real-time adjustment can improve system performance and avoid a problem that spectral efficiency is reduced because data cannot be transmitted on some symbols in an excessively slow adjustment process.

According to a second aspect, a frame timing synchronization method is provided, where the method is applied to a wireless communications system, the wireless communications system includes a first node and a second node, the second node is an upper-level node of the first node, and the method includes: determining, by the second node, a first network timing advance of the first node; and sending, by the second node, transmission timing information to the first node, where the transmission timing information includes the first network timing advance; the transmission timing information is used by the first node to determine frame timing, and the frame timing includes a downlink frame sending time and/or an uplink frame receiving time of the first node. In the foregoing technical solution, the second node sends the first network timing advance to the first node, so that the first node can obtain the transmission timing information and adjust the frame timing, thereby avoiding mutual interference between nodes caused by asynchronization between the nodes.

In a possible implementation of the second aspect, the transmission timing information further includes a timing offset.

In a possible implementation of the first aspect, before the sending, by the second node, transmission timing information, the method further includes: receiving, by the second node, timing capability information or a timing configuration request sent by the first node, where the timing capability information is used to indicate a capability of the first node to support a global positioning system, and the timing configuration request is used to request the second node to send the transmission timing information to the first node. In the foregoing technical solution, the second node can obtain an attribute of the first node, and can configure the transmission timing information for the first node in time, so that the first node can provide a service for a terminal as soon as possible.

In a possible implementation of the second aspect, the second node configures a second threshold N2 for the first node, where the second threshold N2 is used to indicate a maximum timing adjustment amount or a minimum timing adjustment amount of the first node in a unit time. In the foregoing technical solution, because it can be ensured that when an absolute value of a difference between the actual network timing advance and the first network timing advance is greater than a threshold, when the first node is configured to perform frame timing adjustment, a sudden change in frame timing does not occur, a performance loss caused by an error of downlink transmission of a terminal served by the first node may be resolved.

In a possible implementation of the second aspect, the second node reconfigures a timing reference signal of the first node; and the second node receives a second network timing advance sent by the first node. In the foregoing technical solution, the second node may determine, by receiving the second network timing advance sent by the first node, a symbol used when sending data to the first node, or determine whether to adjust the network timing advance of the first node, to resolve a system performance loss caused by insufficient synchronization precision when a deviation occurs in network synchronization.

In a possible implementation of the second aspect, the second node configures a timing reference signal of a third node for the first node; and the second node receives a third network timing advance sent by the first node, where the third network timing advance corresponds to the timing reference signal of the third node, and the third node is the upper-level node of the first node. In the foregoing technical solution, the third network timing advance may be determined in advance by using the timing reference signal of the third node, and the third node may determine, in advance based on the network timing advance of the first node, a symbol used when transmitting data to the first node, thereby accelerating a transmission process and avoiding a transmission error.

In a possible implementation of the second aspect, the second node sends a transmission timing reconfiguration message to the first node, where the transmission timing reconfiguration message is used to adjust network timing of the first node, and the transmission timing reconfiguration message includes a fourth network timing advance and/or a maximum timing adjustment amount or a minimum timing adjustment amount in a unit time. In the foregoing technical solution, network timing (frame timing) of the first node is readjusted, so that utilization of a symbol between the first node and an upper-level node can be increased, and spectral efficiency can be improved.

According to a third aspect, a terminal timing method is provided. The method includes: receiving, by a terminal, a system message or a dedicated message sent by a first node, where the system message or the dedicated message includes frame timing update information of the first node, and the frame timing update information includes a frame timing adjustment amount of the first node; and adjusting, by the terminal, a timing advance for uplink transmission of the terminal based on the frame timing adjustment amount of the first node. In the foregoing technical solution, the terminal adjusts the timing advance for uplink transmission by receiving the frame timing adjustment amount sent by the first node, to resolve a transmission performance loss caused by a timing deviation that occurs in uplink transmission because the frame timing of the first node changes, and the timing advance for uplink transmission of the terminal does not change.

According to another aspect of this application, a first node is provided. The first node is configured to implement a function of the frame timing synchronization method provided in any possible implementation of the first aspect. The function may be implemented by hardware, or may be implemented by hardware by executing corresponding software. The hardware or the software includes one or more units corresponding to the foregoing function.

In a possible implementation, a structure of the first node includes a processor and a memory, the memory stores code and data, the memory is coupled to the processor, and the processor is configured to support the terminal in performing the frame timing synchronization method provided in any one of the first aspect or the possible implementations of the first aspect. Optionally, the first node may further include a communications interface, and the communications interface is coupled to the processor or the memory.

According to another aspect of this application, a second node is provided. The second node is configured to implement a function of the frame timing synchronization method provided in any one of the second aspect or the possible implementations of the second aspect. The function may be implemented by hardware, or may be implemented by hardware by executing corresponding software. The hardware or the software includes one or more units corresponding to the foregoing function.

In a possible implementation, a structure of the second node includes a processor and a memory, the memory stores code required for a processor and/or a baseband processor, the memory is coupled to the processor, and the processor and/or the baseband processor is configured to support the second node in performing a function of the frame timing synchronization method provided in any one of the second aspect or the possible implementations of the second aspect. Optionally, the second node may further include a communications interface, and the communications interface is coupled to the memory or the processor.

According to another aspect of this application, a terminal is provided. The terminal is configured to implement a function of the method for determining an uplink sending timing advance according to any one of the third aspect or the possible implementations of the third aspect. The function may be implemented by hardware, or may be implemented by hardware by executing corresponding software. The hardware or the software includes one or more units corresponding to the foregoing function.

In a possible implementation, a structure of the terminal includes a processor and a memory, the memory stores code required for a processor and/or a baseband processor, the memory is coupled to the processor, and the processor and/or the baseband processor is configured to support the terminal in performing a function of the method for determining an uplink sending timing advance according to any one of the third aspect or the possible implementations of the third aspect. Optionally, the terminal may further include a communications interface, and the communications interface is coupled to the memory or the processor.

According to another aspect of this application, a computer-readable storage medium is provided. The computer-readable storage medium stores an instruction. When the instruction is run on a computer, the computer is enabled to perform the frame timing synchronization method according to any one of the first aspect or the possible implementations of the first aspect, perform the frame timing synchronization method according to any one of the second aspect or the possible implementations of the second aspect, or perform the method for determining an uplink sending timing advance according to any one of the third aspect or the possible implementations of the third aspect.

According to another aspect of this application, a computer program product including an instruction is provided. When the computer program product is run on a computer, the computer is enabled to perform the frame timing synchronization method according to any one of the first aspect or the possible implementations of the first aspect, perform the frame timing synchronization method according to any one of the second aspect or the possible implementations of the second aspect, or perform the method for determining an uplink sending timing advance according to any one of the third aspect or the possible implementations of the third aspect.

According to another aspect of this application, a communications system is provided. The communications system includes a plurality of devices, and the plurality of devices include a first node, a second node, a third node, and a terminal. The first node is the first node according to the foregoing aspects, and is configured to support a relay device in performing the frame timing synchronization method according to any one of the first aspect or the possible implementations of the first aspect, and/or the second node is the second node according to the foregoing aspects, and is configured to support the second node in performing the frame timing synchronization method according to any one of the second aspect or the possible implementations of the second aspect, and/or the terminal is the terminal according to the foregoing aspects, and is configured to support the terminal in performing the method for determining an uplink sending timing advance according to any one of the third aspect or the possible implementations of the third aspect.

According to another aspect of this application, an apparatus is provided. The apparatus is a processor, an integrated circuit, or a chip, and is configured to perform steps performed by a processing unit of a first node in the embodiments of the present invention, for example, determine frame timing of the first node based on transmission timing information sent by a second node. The transmission timing information and a manner of obtaining the transmission timing information have been described in the foregoing other aspects or embodiments, and details are not described herein again.

According to another aspect of this application, another apparatus is provided. The apparatus is a processor, an integrated circuit, or a chip, and is configured to perform steps performed by a processing unit and a sending unit of a second node in the embodiments of the present invention, for example, determine a first network timing advance of a first node, and send transmission timing information to the first node. Determining the first network timing advance and sending the transmission timing information have been described in the foregoing other aspects or embodiments, and details are not described herein again.

According to another aspect of this application, another apparatus is provided. The apparatus is a processor, an integrated circuit, or a chip, and is configured to perform steps performed by a receiving unit and a processing unit of a terminal in the embodiments of the present invention, for example, receive a system message or a dedicated message sent by a first node, and adjust a timing advance for uplink transmission of the terminal. Receiving the system message or the dedicated message sent by the first node and adjusting the timing advance for uplink transmission of the terminal have been described in the foregoing other aspects or embodiments, and details are not described herein again.

It may be understood that the apparatus, the computer storage medium, or the computer program product of any timing method provided above are all configured to perform the corresponding method provided above. Therefore, for beneficial effects that can be achieved by the apparatus, the computer storage medium, or the computer program product, refer to the beneficial effects of the corresponding method provided above, and details are not described herein again.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

It should be understood that names of all signaling and messages in this application are merely names set for ease of description in this application, and may be different names in an actual network. It should not be understood that names of various signaling are limited in this application. On the contrary, any name that has a same or similar function as that of signaling or a message used in this application is considered as a method or an equivalent replacement in this application, and is within the protection scope of this application. Details are not described below.

Figure 1:
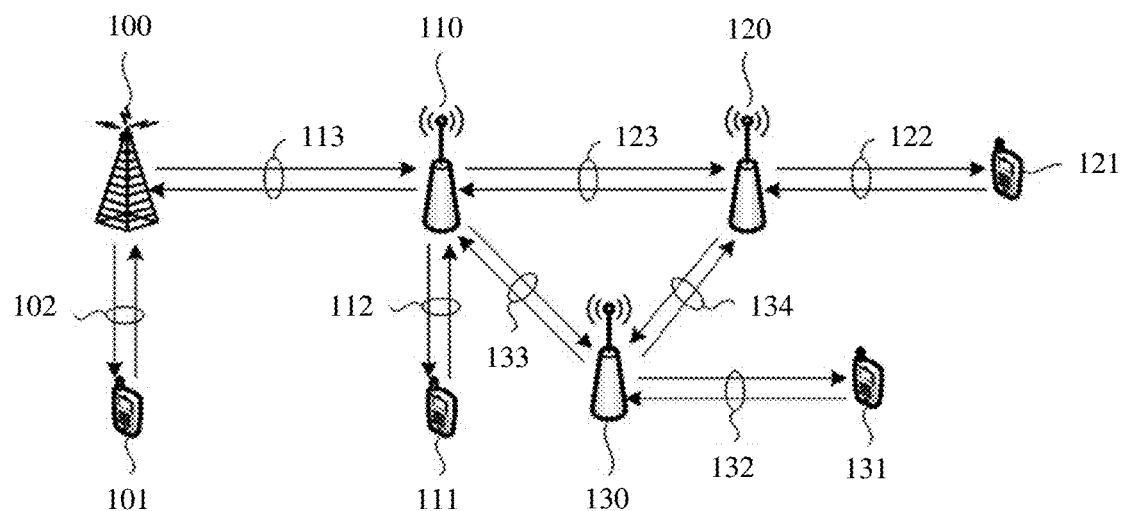
FIG. 1 is a schematic structural diagram of a communications system according to an embodiment of this application.

FIG. 1 is a schematic structural diagram of a communications system to which the embodiments of this application are applicable.

It should be noted that the communications system mentioned in the embodiments of this application includes but is not limited to a narrowband internet of things (NB-IoT) system, a long term evolution (LTE) system, a next-generation 5G mobile communications system or a communications system after 5G, or a device to device (D2D) communications system.

In the communications system shown in FIG. 1, an integrated access and backhaul IAB system is provided. An IAB system includes at least one base station 100, one or more terminals 101 served by the base station 100, one or more relay nodes rTRPs 110, and one or more terminals 11 served by the rTRPs 110. The base station 100 is usually referred to as a donor base station (donor next generation NodeB, DgNB). The rTRP 110 is connected to the base station 100 via a wireless backhaul link 113. In this application, the terminal is also referred to as a terminal, and the donor base station is also referred to as a donor node. The base station includes but is not limited to an evolved NodeB (eNB), a radio network controller (RNC), a NodeB (NB), a base station controller (BSC), a base transceiver station (BTS), a home base station (for example, a home evolved NodeB, or a home node B, HNB), a baseband unit (BBU), a next-generation new radio base station (for example, a gNB), or the like.

The integrated access and backhaul system may also include a plurality of other relay nodes, such as an rTRP 120 and an rTRP 130. The rTRP 120 is connected to the relay node rTRP 110 via a wireless backhaul link 123 to access a network. The rTRP 130 is connected to the relay node rTRP 110 via a wireless backhaul link 133 to access a network. The rTRP 120 serves one or more terminals 121, and the rTRP 130 serves one or more terminals 131. In FIG. 1, both the relay nodes rTRP 110 and rTRP 120 are connected to a network via the wireless backhaul links. In this application, the wireless backhaul links are described from a perspective of the relay nodes. For example, the wireless backhaul link 113 is a backhaul link of the relay node rTRP 110, and the wireless backhaul link 123 is a backhaul link of the relay node rTRP 120. As shown in FIG. 1, a relay node, such as a relay node 120, may be connected to another relay node 110 via a wireless backhaul link, such as a wireless backhaul link 123, to connect to a network. In addition, the relay node may be connected to the network through a plurality of levels of wireless relay nodes.

Usually, a node, such as a node 110, that provides a wireless backhaul link resource is referred to as an upper-level node of the relay node 120, and the relay node 120 is referred to as a lower-level node of the relay node 110. Generally, the lower-level node may be considered as a terminal of the upper-level node. It should be understood that, in the integrated access and backhaul system shown in FIG. 1, one relay node is connected to one upper-level node. However, in a future relay system, to improve reliability of a wireless backhaul link, one relay node, such as the relay node 120, may be served by a plurality of upper-level nodes at the same time. For example, the rTRP 130 in the figure may also be connected to the relay node rTRP 120 via a backhaul link 134. In other words, both the rTRP 110 and the rTRP 120 are upper level nodes of the rTRP 130. In this application, the terminals 101, 111, 121, and 131 may be static or mobile devices. For example, the mobile device may be a mobile phone, an intelligent terminal, a tablet computer, a notebook computer, a video game console, a multimedia player, even a mobile relay node, or the like. The static device is usually located at a fixed location, such as a computer, an access point (connected to a network via a wireless link, such as a static relay node), or the like. Names of the relay nodes rTRPs 110, 120, and 130 do not limit a scenario or a network in which the relay nodes rTRPs 110, 120, and 130 are deployed, and may be any other name such as a relay or an RN. For ease of description, the rTRPs are used in this application.

In FIG. 1, radio links 102, 112, 122, 132, 113, 123, 133, and 134 may be bidirectional links, including uplink and downlink transmission links. Particularly, the wireless backhaul links 113, 123, 133, and 134 may be used by upper-level nodes to provide services for lower-level nodes. For example, an upper-level node 100 provides a wireless backhaul service for a lower-level node 110. It should be understood that uplink and downlink of a backhaul link may be separate. To be specific, an uplink and a downlink are not transmitted through a same node. Downlink transmission refers to transmitting information or data from an upper-level node, such as the node 100, to a lower-level node, such as the node 10. Uplink transmission refers to transmitting information or data from a lower-level node, such as the node 110, to an upper-level node, such as the node 100. The node is not limited to a network node or a terminal. For example, in a D2D scenario, the terminal may serve as a relay node to serve another terminal. In some scenarios, the wireless backhaul link may also be an access link. For example, the backhaul link 123 may also be considered as an access link of the node 110, and the backhaul link 113 is also an access link of the node 100. It should be understood that the upper-level node may be a base station or a relay node, and the lower-level node may be a relay node or a terminal having a relay function. For example, in a D2D scenario, the lower-level node may alternatively be a terminal.

In FIG. 1, the donor node is a node that may access a core network through the node, or an anchor base station in a radio access network. The donor node may access a network through the anchor base station. The anchor base station is responsible for processing data at a packet data convergence protocol (PDCP) layer, receiving data from a core network and forwarding the data to a relay node, or receiving data from a relay node and forwarding the data to a core network.

For ease of description, the relay node is referred to as a first node, and an upper-level node of the first node is referred to as a second node below. The first node and the second node may be base stations, relay nodes, terminals having relay functions, or any devices having relay functions.

When the relay node is under a half-duplex constraint, spectrum resources of a wireless backhaul link and an access link in in-band relay overlap, in other words, the backhaul link and the access link in in-band relay have a same frequency band. For example, when an rTRP performs receiving on a downlink wireless backhaul link of a base station, the rTRP cannot perform transmission on a subordinate terminal or device. When the rTRP performs uplink transmission on an upper-level node on the backhaul link, the rTRP cannot receive transmission performed by the subordinate terminal or device on an uplink access link or a backhaul link of a lower-level node. It should be understood that a half-duplex constraint of the in-band relay is a half-duplex constraint for simultaneous intra-frequency receiving and sending, and is irrelevant to a time division duplexing (TDD) or frequency division duplexing (FDD) used by a system.

In a wireless relay system, especially for a TDD system, frame timing synchronization between relay nodes needs to be maintained. If a case in which relay nodes are not strictly synchronized occurs, mutual interference between upper-level and lower-level nodes is caused, and system performance is affected. Therefore, a high-precision synchronization solution is extremely important for a relay system. In an IAB system, because wireless backhaul is used, synchronization of the first node (the relay node) usually depends on the second node (the upper-level node). If the first node has an auxiliary positioning system, for example, a global positioning system (GPS), precise synchronization can be implemented. However, in many scenarios, limited by factors such as deployment and costs, the first node (the relay node) does not have a GPS. In this scenario, frame timing synchronization of the first node depends on a timing reference signal of the second node.

In this application, frame timing synchronization is to implement synchronization between network nodes, that is, network synchronization. In a wireless network, one radio frame includes a plurality of subframes, for example, includes 10 subframes, or includes a plurality of slots. In this application, synchronization includes frame synchronization, subframe synchronization, or slot synchronization. Synchronization means that frames, sub-frames, or slots of nodes (including the base station and the relay node) in a network are kept aligned, in other words, start positions of the frames, sub-frames, or slots of the nodes are kept consistent. Synchronization is determined through frame timing, subframe timing, or slot timing. In other words, the frame timing, the subframe timing, or the slot timing of all the nodes is kept consistent. Therefore, timing refers to a time for a start location of a frame, a subframe, or a slot. An essence of frame synchronization, subframe synchronization, slot synchronization, or network synchronization is to make the frame timing, the subframe timing, or the slot timing of all the nodes be the same. In this application, timing of the nodes is described by using the frame timing, the subframe timing, or the slot timing. In a wireless system, both a TDD system and an FDD system have an uplink subframe and a downlink subframe, and implement frame synchronization or subframe synchronization that includes downlink (sub)frame synchronization and uplink (sub)frame synchronization. For example, if downlink (sub)frame synchronization is determined, uplink (sub)frame synchronization is also determined. In this application, network synchronization, frame synchronization, and subframe synchronization may be used without distinguishing. Network synchronization may implement maintenance of timing alignment (timing alignment) of radio frames between a plurality of nodes, such as an upper-level node and a lower-level node, through timing information such as a timing reference signal, to avoid interference between network nodes (the relay node and the base station) caused by a frame timing deviation or a subframe timing deviation and reduce a system throughput. The timing reference signal in this application includes but is not limited to a synchronization signal/physical broadcast channel block (SS/PBCH block), a tracking reference signal (TRS), a phase tracking reference signal (PTRS), a channel state information-reference signal (CSI-RS), and a demodulation reference signal (DMRS) signal that are sent by the second node. The TRS is also referred to as a CSI-RS for tracking in an NR protocol.

Figure 2:
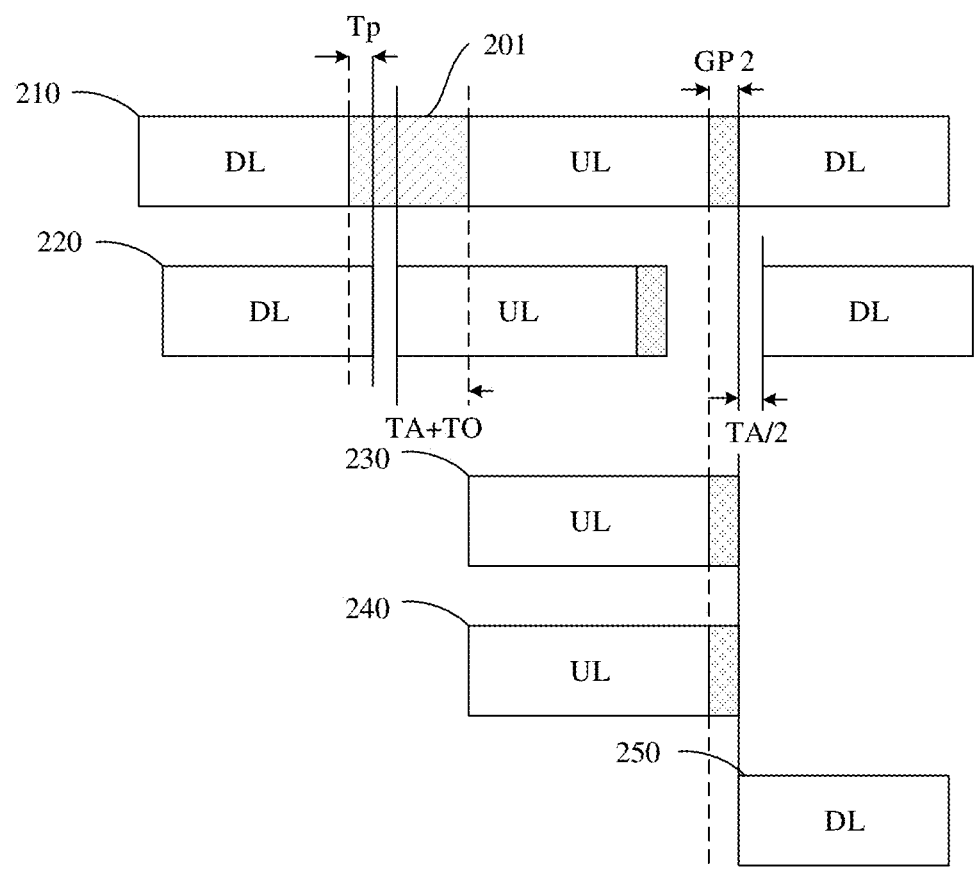
FIG. 2 is a schematic diagram of a basic process of determining (sub)frame timing by a first node according to an embodiment of this application.

A basic process of determining (sub)frame timing by the first node is shown in FIG. 2. In FIG. 2, TDD is used as an example. 210 represents a slot time sequence relationship of a second node, and 210 includes a downlink (DL) slot, a first guard gap (GP 1) 201, an uplink (UL) slot, and a second guard gap GP 2. The GP 1 is a configured guard gap for switching from downlink sending to uplink receiving, and the GP 2 is a default guard gap for switching from uplink receiving to downlink sending by an upper-level node. It should be understood that both an uplink slot (or subframe) and a downlink slot (or subframe) include a plurality of symbols, and are represented only by using a UL slot (or subframe) or a DL slot (or subframe) in the figure. For TDD, the guard gap GP 1 is used in a process in which the base station switches from downlink sending to uplink transmission. In a protocol, the GP 1 is included in one or more X (flexible) symbols. X may be used for uplink transmission, or may be used for downlink transmission. In the figure, a downlink slot may include X, and an uplink slot may also include X. 220 represents a time sequence relationship between downlink receiving and uplink sending of the first node, that is, a process of switching from a time at which a downlink subframe sent by the second node is received to uplink sending. An interval from a time at which the second node sends a subframe to a time at which the first node receives a downlink subframe is a Tp. The Tp represents a transmission delay. Because of the transmission delay and a time at which the second node switches from an uplink subframe to a downlink subframe, an actual uplink sending timing advance of the first node is a sum of a TA and a timing advance offset (TO). In ideal synchronization, a length of the TA is twice a length of the Tp, and the TO is the timing advance offset and is generally a fixed value defined in a protocol. Whether the TO is a fixed value or a configured value is not limited in this application. 230 indicates a timing relationship between uplink subframes in the time sequence relationship 220 between uplink sending of the first node actually received by the second node and sending of the first node. Due to an air interface transmission delay, there is a delay Tp between the uplink sending of the first node received by the second node and sending of the first node. 240 is receiving timing that is for uplink transmission of the first node received by the second node and that is considered from a perspective of the first node. In ideal synchronization, timing of 230 and 240 is consistent. To be specific, timing for uplink transmission of the first node actually received by the second node is consistent with timing that is for uplink transmission of the first node received by the second node and that is considered by the first node. The ideal synchronization means that the guard gap GP 2 after an uplink subframe of the second node is the same as the TO. To be specific, the TO is a timing advance offset TA_offset defined in a protocol, in a low frequency band (a frequency range (FR) 1 in the protocol), TO=25560 $T_c$ (approximately equal to 13 ms), and in a high frequency band (an FR 2 in the protocol), TO=13763 $T_c$ (approximately 7 ms). $T_c$ is a basic time unit in NR, and $T_c=1/(480*10^3*4096)$s. In an ideal situation, the TA is twice the Tp. Therefore, the relay node may set (sub)frame timing of the relay node as TA/2 earlier than a time at which a downlink backhaul link subframe is received, thereby implementing alignment with frame timing of the upper-level node. 250 is downlink frame timing of the relay node, that is, a time point at which downlink data is transmitted to a terminal served by the relay node.

In a frame timing relationship shown in FIG. 2, the first node first determines downlink receiving timing by searching for an SS/PBCH block of the upper-level node, and then accesses the upper-level node through a random access process. The upper-level node configures a timing advance (TA) for the first node in the random access process, and the first node sends an uplink signal based on the TA. In a subsequent process, the second node may adjust the TA of the first node at any time.

Figure 3:
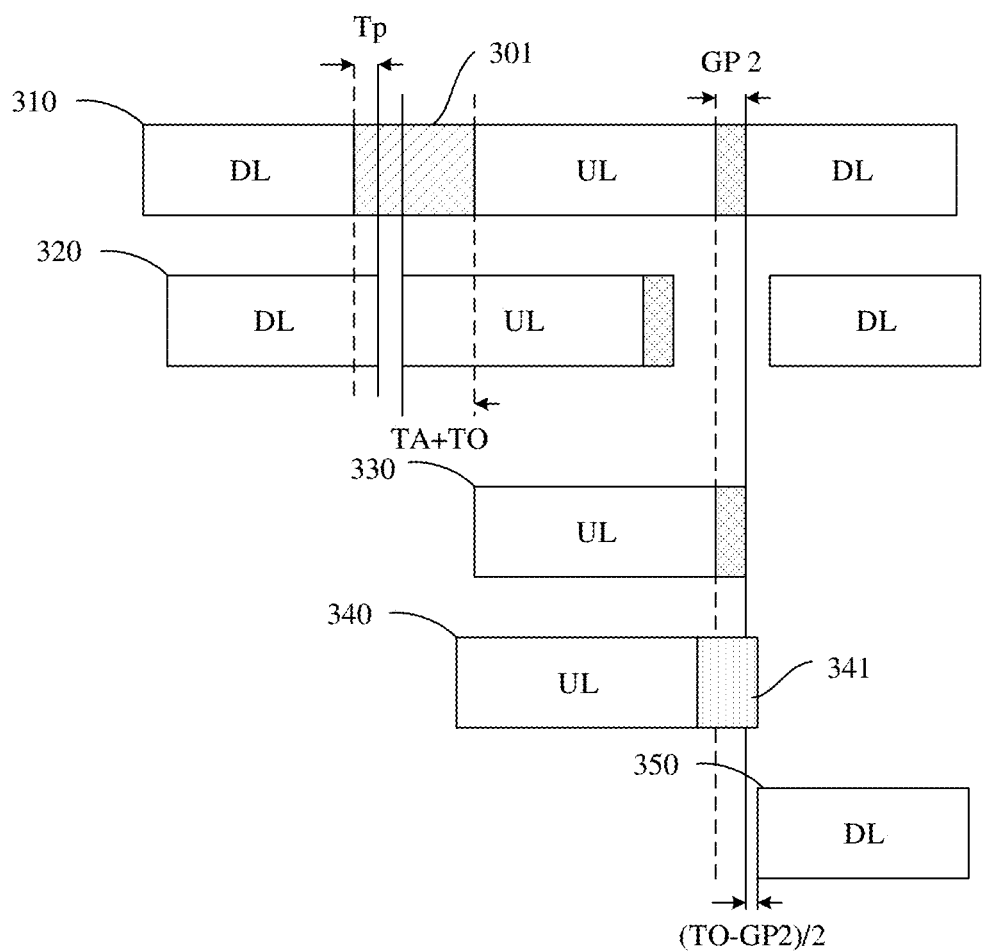
FIG. 3 is a schematic diagram when a network timing advance in a first node is inaccurate according to an embodiment of this application.

In FIG. 2, the TO is generally a fixed value and is defined by a protocol. In a process in which the base station switches from uplink transmission to downlink transmission, because devices are different, switching times of the base station may be different. Consequently, a value of the TO and a value of the GP 2 are different. Generally, the GP 2 may be less than the TO. Therefore, TA=2*$T_p$−(TO−GP2), to obtain $T_p$=TA/2+(TO−GP2)/2. However, the relay node still considers $T_p$=TA/2. This causes a downlink timing deviation, as shown in FIG. 3. FIG. 3 is similar to FIG. 2, and details are not described again. The following describes only a difference. Because the TO and the GP 2 are different, the relay node considers that receiving time of the upper-level node is actually slightly earlier than actual receiving time of the upper-level node. However, it is stilled considered from a perspective of the second node that transmission of the relay node starts from a receiving time. Therefore, an obtained TA is smaller than an actual TA of the relay node (by TO−GP2). Therefore, when the second node adjusts a TA of the first node, the TA is smaller than an actual TA value. If the first node continues to use the TA/2, a timing deviation occurs, as shown in 350 in FIG. 3.

In addition to the foregoing case in which the GP 2 is not equal to the TO, another reason may also cause that the TA/2 is not equal to the Tp. For example, a receive window of the upper-level node is not strictly aligned with an uplink signal of the relay node (that is, uplink non-ideal synchronization), and uplink and downlink propagation delays are not equal. A reason why the TA/2 is not equal to the Tp is not limited in this application.

In addition, in some cases, the upper-level node of the first node may change. In this case, a timing advance of uplink transmission of the first node may also need to be adjusted.

When the foregoing case occurs, the first node cannot accurately determine (sub)frame timing, especially when the first node does not have an auxiliary timing system, such as a global positioning system (GPS). How to ensure precise network synchronization of the first node in an IAB system needs to be considered.

For ease of description, the following first defines concepts or names to be used below.

A reference timing reference signal is a timing reference signal that is configured or predefined by the upper-level node (the second node) for the relay node (the first node) and that is used to determine frame timing of the second node.

A first network timing advance refers to a parameter that is configured by the upper-level node (the second node) for the relay node (the first node) and that is used by the first node to determine the frame timing. The first node may determine the frame timing through the first network timing advance, and the first network timing advance is denoted as $F_A$.

A timing reference refers to a start position that is of a downlink frame of the second node and that is detected by the first node, and more specifically, refers to a time at which the first node receives a first detectable path of a downlink frame of the second node. The timing reference is inferred by the first node by detecting a timing reference signal. A plurality of timing reference signals may be configured for the first node, but there is only one reference timing reference signal. The timing reference determined by the reference timing reference signal is referred to as a reference timing reference.

An application timing advance is an application timing advance determined by the first node based on transmission timing information. The application timing advance represents an advance of the frame timing of the first node relative to the reference timing reference, and is denoted as $T_{app}^1$. The transmission timing information includes a first network timing offset.

An actual network timing advance is a deviation of the frame timing of the first node relative to the reference timing reference, and is a positive number. Generally, the application timing advance is different from the actual network timing advance because of a timing drift of a crystal oscillator, or an actual timing advance is different from the application timing advance because the timing reference signal is reconfigured.

Nominal frame timing is frame timing determined $T_{app}^1$ in advance based on the reference timing reference.

A second network timing advance refers to a difference between the nominal frame timing and a timing reference that is determined by the first node based on a new timing reference signal, and is a positive number or 0. The new timing reference signal is a reference timing reference signal reconfigured by the second node for the first node.

A third network timing advance refers to a difference between the nominal frame timing and a timing reference that is determined by the first node based on a timing reference signal of the third node, and is a positive number or 0. The third node is an upper-level node of the first node.

To implement precise (sub)frame timing of the first node, in a frame timing synchronization method provided in this application, the first node receives the transmission timing information sent by the second node, where the transmission timing information includes the first network timing advance; and the first node determines the frame timing of the first node based on the transmission timing information, where the frame timing includes a downlink frame sending time and/or an uplink frame receiving time of the first node. The transmission timing information further includes a timing offset, that the first node determines the frame timing of the first node based on the transmission timing information includes: The first node determines the frame timing of the first node based on the first network timing advance in the transmission timing information.

Further, in an actual environment, the actual network timing advance of the first node may change. When the first node detects that an absolute value of a difference between the actual network timing advance and the application timing advance is greater than a first threshold N1, the first node adjusts the frame timing based on a second threshold N2, where the second threshold N2 is predefined or configured by the second node, the second threshold N2 is used to indicate a maximum timing adjustment amount or a minimum timing adjustment amount of the first node in a unit time, and the application timing advance is determined based on the transmission timing information.

However, in some other cases, the timing reference signal of the first node may change. When the timing reference signal of the first node is reconfigured by the second node, the first node determines the second network timing advance, and sends the second network timing advance to the second node. The second network timing advance is used by the second node to determine a backhaul resource configuration used when sending a signal to the first node, or may be used by the second node to reconfigure the transmission timing information for the first node.

Alternatively, in a process in which an upper-level node of the first node is switched from the second node to a third node, the first node determines the third network timing advance and sends the third network timing advance to the third node. The third network timing advance is used by the third node to determine the backhaul resource configuration used when sending a signal to the first node, or may be used by the third node to reconfigure the transmission timing information for the first node. Use of the third node after obtaining the third network timing advance is not limited in this application.

Alternatively, the first node re-determines the frame timing when the timing reference signal of the first node is reconfigured; and the first node sends, through a system message or a dedicated message, frame timing update information to a lower-level node served by the first node, where the frame timing update information includes a frame timing adjustment amount of the first node.

Correspondingly, if the first node sends, through the system message or the dedicated message, the frame timing update information to the lower-level node served by the first node, a terminal served by the first node receives the system message or the dedicated message sent by the first node. The system message or the dedicated message includes the frame timing update information of the first node, and the frame timing update information includes the frame timing adjustment amount of the first node. The terminal adjusts a timing advance for uplink transmission of the terminal based on the frame timing adjustment amount of the first node.

Figure 4:
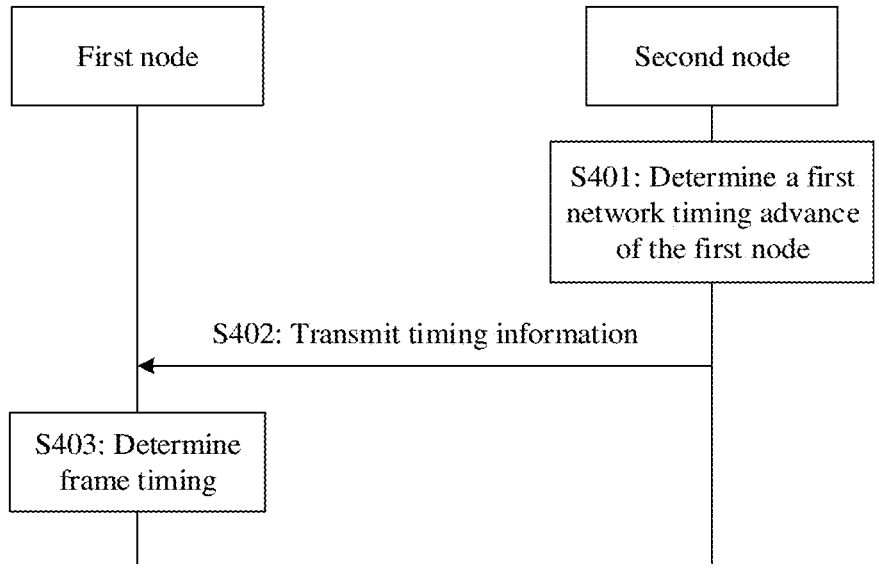
FIG. 4 is a flowchart of frame timing synchronization of a relay system according to an embodiment of this application.

FIG. 4 is a flowchart of frame timing synchronization of a relay system. Usually, a first node selects an upper-level node, that is, a second node, as a synchronization source. To be specific, the first node receives transmission timing information of the second node, and the first node performs frame synchronization based on transmission timing information. Frame synchronization is to implement synchronization of a radio frame or a subframe, or slot synchronization. Essentially, frame synchronization is to determine a boundary of a radio frame, a subframe, or a slot. The boundary refers to a start position of a radio frame, a subframe, or a slot, that is, frame timing, or subframe timing, or slot timing. Synchronization, that is, system synchronization, between network nodes may be implemented through frame synchronization. In a wireless network, if a start location of a radio frame is determined, locations of all subframes may be determined, or if a start location of a subframe is determined, a boundary of the radio frame may be determined. A case for slot synchronization is similar. Usually, the first node cannot simply determine frame timing of the first node by receiving a timing reference signal of the second node, because an offset has been generated, due to a transmission delay, between a time at which a timing reference signal sent by the second node is received and a sending time of the second node. Therefore, the second node (the upper-level node) needs to detect an uplink signal of the first node, to obtain a transmission delay and determine (sub)frame timing. To obtain the transmission timing information, FIG. 4 includes the following steps.

S401: The second node determines a first network timing advance of the first node. Determining the first network timing advance needs to depend on the uplink signal sent by the first node. For example, the second node measures a random access preamble or a sounding reference signal (SRS) sent by the first node. The second node may estimate the transmission delay through the uplink signal of the first node, to obtain the first network timing advance of the first node. A specific relationship between the first network timing advance and the transmission delay is described below. Using the random access preamble as an example, an uplink transmission advance used when the first node initially sends the random access preamble is zero, and there is only one predefined TA_offset advance. After receiving the preamble sent by the first node, the second node determines a start position of the received preamble. In this way, a TA can be determined. A method for estimating the transmission delay is well known to a person of ordinary skill in the art, and details are not described again.

S402: The first node receives the transmission timing information sent by the second node. The transmission timing information is used by the first node to determine frame timing. Because the first node is a relay node and needs to provide a service for a terminal or another node, the first node needs to implement a receiving and sending operation of a radio frame. In a TDD system, an uplink subframe and a downlink subframe are included. Herein, the TDD system is merely used as an example. It should not be understood that all the embodiments of this application are merely used in the TDD system. This application uses the TDD system as an example for description merely for ease of description, but solutions described in this application are also applicable to an FDD system.

The transmission timing information includes different information according to different solutions. In a possible implementation, the transmission timing information includes the first network timing advance. Different from the foregoing timing advance, the first network timing advance is an adjusted timing advance. In other words, the second node adjusts the TA to make the TA as close as possible to 2*Tp. Herein, the TA is referred to as the first network timing advance. Therefore, the first node may directly use the first network timing advance to perform frame timing. Assuming that the first network timing advance is $F_{TA}^{1}$, corresponding downlink frame timing is $F_{TA}^{1}/2$ earlier than a subframe start position of a received timing reference signal. In this solution, an application timing advance of the first node is $F_{TA}^{1}/2$. In this embodiment, the second node may need to send a message to the first node, to indicate that the first node may use at a current time or a specified time $F_{TA}^{1}/2$ as the application timing advance.

In a possible implementation, the transmission timing information includes the first network timing advance and an offset, first network timing advance is a TA currently maintained by the second node, and the offset is an adjustment value configured by the second node. For example, the offset may be a difference between the foregoing TO and GP 2. The second node may send the offset to the first node through a radio resource control (RRC) message or medium access control (MAC) layer control signaling (MAC CE). A specific manner is not limited in this application. After obtaining the configuration of the offset of the transmission timing information, the first node determines the frame timing based on the first network timing advance and the offset in the transmission timing information. A specific determining method is to make a subframe start position of corresponding downlink frame timing $F_{TA}^{1}/2+T_{os}$ earlier than a received timing reference signal. $T_{os}$ is an offset of the transmission timing information and is configured by an upper-level node. Similarly, in this solution, the application timing advance of the first node is $F_{TA}^{1}/2+T_{os}$.

The offset in the transmission timing information is configured by using an integer multiple of $T_c$ as a granularity. For example, the configuration granularity may be 64 $T_c$, 2*64 $T_c$, 4*64 $T_c$, 8*64 $T_c$, or 16*64 $T_c$. In addition, the configuration granularity may be determined by an operating frequency band of the relay node. For example, in an FR1 frequency band, the configuration granularity may be 16*64 $T_c$, and in an FR2 frequency band, the configuration granularity is 2*64 $T_c$ or the like. Alternatively, refer to an uplink timing adjustment granularity of a terminal in NR. When a subcarrier spacing is $2^{\mu}*15$ kHz, $\mu$ represents an index number of a waveform parameter (numerology), and a value of ranges from 0 to 4. A modulation granularity of an uplink TA of the terminal is $16*64*T_c/2^\mu$. Considering that downlink timing requires higher precision, an adjustment granularity for downlink timing can be divided by 2 or 4 based on the uplink granularity of the terminal. Different frequency bands may also predefine µ values. For example, in the FR 1, µ=1, and in the FR 2, µ=3. In addition, may also be directly obtained based on a subcarrier spacing of an SS block of the relay node or an upper-level node. It should be understood that the configuration granularity herein is merely an example, and a value of the configuration granularity is not limited in this application. For example, the configuration granularity may alternatively be 16 $T_c$, 32 $T_c$, or the like. Configuration is performed by using an integer multiple of $T_c$ as a granularity, so that a range of a configured value can be narrowed, thereby reducing signaling overheads. The configuration granularity may be defined in a protocol, or may be configured through higher layer signaling, for example, an RRC message. This is not limited in this application.

In a possible implementation, the second node may directly send, to the first node, a frame timing adjustment amount to be adjusted by the first node, that is, the frame timing adjustment amount is the first network timing advance. The first node directly sets a time earlier than the first network timing advance as the frame timing (or a frame start position). Similarly, in this solution, the application timing advance of the first node is $F_{TA}^1$, that is, the first network timing advance configured by the second node is directly applied. In this solution, a configuration granularity of the first network timing advance is similar to a configuration granularity of $T_{os}$, and details are not described herein again.

S403: The first node determines the frame timing based on the transmission timing information. The first node determines the frame timing according to the foregoing method, and details are not described again. As described above, the frame timing refers to a start location of a frame. A radio frame includes an uplink frame and a downlink frame. The downlink frame is a time at which the first node is configured to send data to a terminal served by the first node, and the uplink frame is a time at which the first node is configured to receive the data sent by the terminal served by the first node. Therefore, the frame timing includes a downlink frame sending time and/or an uplink frame receiving time of the first node. For example, in an FDD system, uplink and downlink are separated, while in a TDD system, uplink frame timing may be determined mainly by determining downlink frame timing.

It should be noted that the first network timing advance used for the frame timing is different from a TA used for data transmission on a backhaul link, and the first network timing advance is used only by the first node to perform the frame timing, and does not change with adjustment of the TA during data transmission on the backhaul link.

According to the foregoing embodiment, the first node may obtain precise timing configuration or adjustment information through the transmission timing information, to configure or adjust the frame timing of the first node, so that the first node keeps network synchronization with the second node. In this way, interference between nodes and degradation of system performance that are caused by a network synchronization deviation are avoided.

Figure 5:
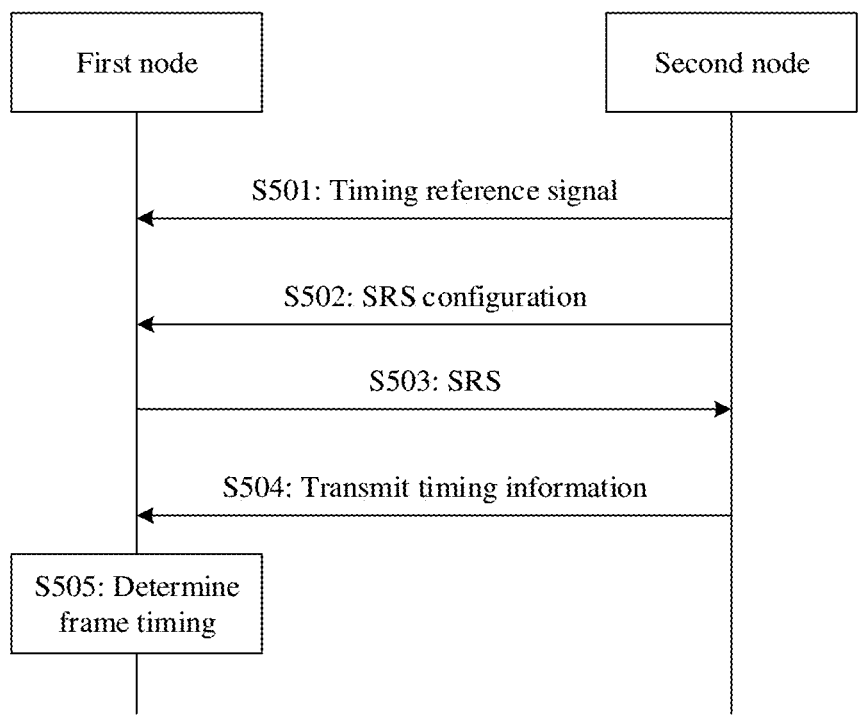
FIG. 5 is a flowchart of determining a network timing advance by a second node according to an embodiment of this application.

In the foregoing solution, usually, the first node obtains a timing reference for downlink transmission of the second node by measuring the timing reference signal of the second node. The timing reference signal is as described above. The timing reference actually has a delay, that is, Tp, relative to timing (or the downlink frame sending time) of a downlink frame of the second node. Tp is a transmission delay. To obtain a transmission delay, the second node needs to measure an uplink signal of the first node, and usually measures a sounding reference signal (SRS). Therefore, it should be understood that, before the foregoing embodiment, a reference signal sending and measurement process should be further included. A specific process is shown in FIG. 5.

S501: A first node receives a timing reference signal sent by a second node. The timing reference signal may be an SS/PBCH block, a CSI-RS, a TRS, or the like. This is not limited in this application. A specific used timing reference signal may be defined in a protocol, or may be configured by the second node for the first node, or may be a default reference signal. If the configuration is performed by an upper-level node, the configuration is usually performed through an RRC message. Therefore, the RRC message needs to include a configuration of the timing reference signal. The configuration of the timing reference signal may specify a type of a reference signal and/or a parameter of the timing reference signal, for example, a parameter or an index for generating a sequence of the timing reference signal (or the reference signal). It should be understood that the timing reference signal may be shared with another reference signal. For example, a CSI-RS is used as a fine synchronization signal, and is also used as the timing reference signal. A timing reference signal does not necessarily need to be specially defined. Certainly, a dedicated timing reference signal may alternatively be defined. This is not limited in this application.

After receiving the timing reference signal, the first node obtains a timing reference. The timing reference has a delay relative to frame timing (or a start time of a sending frame) of the second node, and is a transmission delay Tp from the second node to the first node. In a possible implementation, the first node sends signaling to the second node, to indicate that timing reference estimation has been completed.

S502: The second node configures an SRS for the first node. It should be understood that step S502 may also be performed before S501. Because sending of the timing reference signal is a frequent process, the second node usually configures the SRS, including a time-frequency resource used by the SRS, a period, and the like. Generally, the SRS needs to have a QCL (for example, spatial QCL) relationship with a previous timing reference signal. This process is the same as a conventional SRS configuration process, and is not described in detail herein.

S503: The first node sends the SRS to the second node, and the second node measures the SRS to improve delay estimation precision, to obtain a network timing advance of the first node, and sends the network timing advance, that is, a first network timing advance in transmission timing information, to the first node in step S504.

In another possible implementation, in a process in which the first node accesses the second node for the first time, the first node does not have the SRS, that is, step S502 does not exist. In this case, the first node sends a random access preamble in an uplink direction, and the second node measures the random access preamble, to determine a timing advance of the first node. In this case, the timing reference signal in S501 may only be an SS/PBCH block. However, the timing advance determined through the SS/PBCH block and the random access preamble is relatively rough. Therefore, in a subsequent process, a more precise network timing advance is obtained by configuring the timing reference signal and the SRS.

Step S504 and step S505 are respectively the same as step S401 and step S402, and details are not described again.

According to this embodiment, parameter configuration between the first node and the second node can be implemented, the determined timing reference signal is used for timing measurement, and the precise transmission timing information can be obtained, thereby implementing precise network synchronization.

In another possible implementation, before receiving the transmission timing information, the first node sends timing capability information or a timing configuration request to the second node, where the timing capability information is used to indicate a capability of the first node to support a global positioning system, and the timing configuration request is used to request the second node to send the transmission timing information to the first node. It is mainly considered that the first node may send the timing capability information, so that the second node learns that the first node does not have the capability of supporting the global positioning system. It should be understood that the global positioning system includes a GPS, a BeiDou navigation positioning system, and the like. This is not limited in this application. This notification is completed through reporting of the capability of the first node. Therefore, the capability information of the first node needs to include the capability of supporting the global positioning system. Alternatively, the first node may send an explicit request to the second node, to request the second node to configure the transmission timing information for the first node. The second node learns, through the timing configuration request, that the first node does not have the GPS capability, or needs to configure the transmission timing information to implement better frame timing. In a possible implementation, that the first node sends the timing configuration request also indicates that the first node has completed measurement of the timing reference.

Network synchronization is a frequent process, and a root cause of the process is that a timing deviation occurs on a network node (for example, the first node). For example, a crystal oscillator of the first node drifts, and after the crystal oscillator drifts, the timing deviation occurs. Therefore, network synchronization needs to be frequently maintained, to ensure frame synchronization (subframe synchronization) between nodes or ensure that the frame timing of the first node is stable.

A method for obtaining a nominal frame timing and an application advance by the first node is not limited in the following embodiment. For example, the application advance of the first node may be configured by the second node for the first node according to the foregoing embodiment, or may be configured by the second node for the first node according to another method, or may be configured by another upper-level node of the first node for the first node, or the like.

Figure 6:
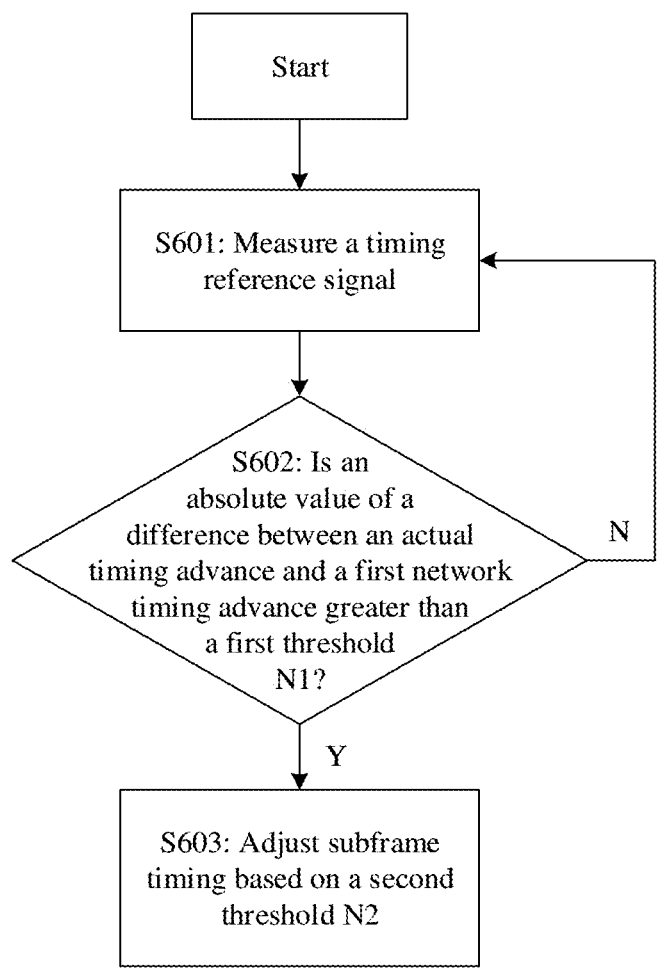
FIG. 6 shows a processing procedure when an actual network timing advance of a first node changes according to an embodiment of this application.

FIG. 6 shows a processing procedure when an actual network timing advance of a first node changes. When the foregoing case occurs, a timing reference signal of the first node is usually not reconfigured, that is, a timing reference measured by the first node is based on a same timing reference signal. Generally, it is considered that timing of an upper-level node is accurate. Therefore, it may be considered that a timing reference obtained by the first node by measuring the timing reference signal is accurate, or the first node considers that timing of a second node is accurate. If the first node finds, through measurement, that frame timing changes, that is, a deviation occurs between a detected actual advance and an application timing advance of the first node, it indicates that a timing offset occurs. In this case, the frame timing of the first node needs to be adjusted, that is, when the first node detects that an absolute value of a difference between the actual timing advance and the application timing advance of the first node is greater than a first threshold N1, the first node adjusts the frame timing based on a second threshold N2. The second threshold N2 is predefined or configured by the second node, and the second threshold is used to indicate a maximum or minimum downlink sending timing value adjusted by the first node in a unit time. The application timing advance of the first node is determined according to the method described in the embodiment in FIG. 4, and details are not described again.

Usually, because the first node may be serving a terminal, if the first node immediately performs quick adjustment after detecting that a deviation occurs between an actual network timing advance and the application timing advance of the first node, a sudden change of downlink timing of the first node is caused, and this may affect transmission performance between the first node and the terminal served by the first node. Therefore, the first node cannot perform fast adjustment when adjusting the frame timing. In addition, when the first node detects that the deviation between the actual network timing advance and the application timing advance of the first node is relatively large, if the adjustment is excessively slow, a relatively long adjustment time may also be caused. Therefore, the adjustment may be performed based on the given threshold N2.

The steps in FIG. 6 are as follows.

S601: A first node measures a timing reference signal. A measurement method is well known to a person of ordinary skill in the art, and is not described in detail herein.

S602: The first node determines whether an absolute value of a difference between an actual network timing advance and an application timing advance of the first node is greater than a first threshold N1. If the absolute value of the difference between the actual network timing advance and the application timing advance of the first node is not greater than the first threshold N1, the timing reference signal continues to be measured; otherwise, go to step S603.

The actual network timing advance herein refers to a difference between actual frame timing (or a frame sending time) of the first node at a measurement time and a timing reference obtained by measuring the timing reference signal, for example, may be calculated by using timing of a same downlink frame. It should be understood that, because drift of a crystal oscillator may cause frame timing to be advanced or delayed, the difference may be greater than the application timing advance of the first node, or may be less than the application timing advance of the first node. Therefore, the absolute value of the difference between the actual timing advance and the application timing advance of the first node needs to be determined.

Herein, N1 may be defined in a protocol, or may be configured by a second node. This is not limited in this application. If N1 is configured by the second node, and usually is configured through an RRC message, specifically, a timing deviation threshold field needs to be added to the RRC message. For example, an integer multiple of $T_c$ used as a granularity is used as a basic unit for configuration. For example, the basic unit may be 64 $T_c$, 2*64 $T_c$, 4*64 $T_c$, or 8*64 $T_c$, 16*64 $T_c$, or the like. The configuration granularity may be defined in a protocol. In addition, configuration may be further performed for different waveform parameters or different bandwidth parts (BWP). Similarly, for different frequency bands or different subcarrier spacings, values of N1 may be different. The subcarrier spacing herein may be a subcarrier spacing of a backhaul link, or may be a subcarrier spacing of an access link of the first node.

S603: The first node adjusts frame timing based on a second threshold N2. As described above, considering a terminal served by the first node, when the first node adjusts the frame timing, an adjustment granularity cannot be excessively large because an excessively large adjustment granularity causes that the terminal cannot track a downlink timing change in time. Therefore, during adjustment, adjustment is performed based on the second threshold N2. The second threshold N2 may be defined in a protocol, or may be configured by the second node. If the second threshold N2 is configured by the second node, the second threshold N2 is usually configured through the RRC message. Specifically, a field of a frame timing adjustment step size is added to configuration signaling of the RRC message, and whether the threshold is a maximum adjustment step size or a minimum frame timing adjustment step size is indicated. Similarly, the second threshold N2 may use an integer multiple of $T_c$ as a basic step size. For example, the basic step size may be 64 $T_c$, 2*64 $T_c$, 4*64 $T_c$, 8*64 $T_c$, or 16*64 $T_c$. The basic step size may be defined in a protocol, or may be configured by the second node. This is not limited in this application. If the basic step size is configured by the second node, the basic step size may also be configured through the RRC message. The second threshold for frame timing adjustment is an adjustment amount used in a unit time, for example, a timing value that can be adjusted for each subframe or each radio frame, or a timing value that can be adjusted for every 10 ms or every 100 ms. Similarly, for different frequency bands or different subcarrier spacings, values of N2 may be different. The subcarrier spacing herein may be a subcarrier spacing of a backhaul link, or may be a subcarrier spacing of an access link of the first node.

In a possible implementation, if the second threshold is configured through the RRC message, one maximum adjustment step size and one minimum adjustment step size may be further separately configured, that is, two second thresholds are included. In a specific adjustment process, whether adjustment is performed based on the maximum adjustment step size or the minimum adjustment step size may be controlled through a MAC CE. Basic units of the maximum adjustment step size and the minimum adjustment step size may also be integral multiples of $T_c$. For example, the basic step size may be 64 $T_c$, 2*64 $T_c$, 4*64 $T_c$, 8*64 $T_c$, 16*64 $T_c$, or the like. The basic step size may be defined in a protocol, or may be configured by the second node. This is not limited in this application. If the basic step size is configured by the second node, the basic step size may also be configured through the RRC message.

In this embodiment, a timing adjustment speed may be determined by the first node, but needs to meet the threshold. In a possible implementation, a self-adjustment speed of the first node for timing needs to meet constraints of both the maximum adjustment step size and the minimum adjustment step size, that is, needs to be between the maximum adjustment step size and the minimum adjustment step size. Both the maximum adjustment step size and the minimum adjustment step size are specified in a protocol or configured by the second node.

Alternatively, another timing adjustment policy may be used. A threshold N3 for an absolute value of a difference between an application timing advance and an actual network timing advance of another first node is defined in a protocol. The first node needs to perform timing adjustment, so that the absolute value of the difference between the application timing advance and the actual network timing advance is always less than or equal to N3, and timing adjustment of the first node needs to meet the threshold N2. Obtaining of N3 is similar to the foregoing description of N1, and details are not described again. In another possible implementation, both the thresholds N1 and N3 and are defined.

According to the embodiment, when the absolute value of the difference between the actual network timing advance and the application timing advance of the first node is greater than the first threshold N1, the frame timing of the first node may be adjusted, thereby ensuring network timing synchronization between the first node and the second node.

In an IAB relay system, because the second node may reconfigure the timing reference signal of the first node, or an upper-level node of the first node changes, for example, switches from one upper-level node to another upper-level node, a timing reference of the first node is suddenly changed. When the timing reference signal of the first node is reconfigured, there may be no quasi-colocation (QCL) relationship between the newly configured timing reference signal and the original timing reference signal. Consequently, the timing reference changes. Regardless of whether the timing reference signal is reconfigured or the upper-level node of the first node is switched from one upper-level node to another upper-level node, the timing reference changes. In addition, some other reasons may also cause a sudden change of the timing reference, for example, a sudden change of a channel between the second node and the first node (due to blocking or the like), or improved precision of timing reference estimation performed by the first node. A reason for the sudden change of the timing reference is not limited in this embodiment.

In this embodiment, in addition to the foregoing timing obtaining method, nominal frame timing may also be obtained by a relay node according to another method (for example, obtained through a GPS). In this case, the relay node may calculate an equivalent application timing advance $T_{app}^1$ through the nominal frame timing and the timing reference.

When the first node has a plurality of upper-level nodes, for ease of distinguishing, a master upper-level node and one or more secondary upper-level nodes may be defined. In this case, the first node may use the master upper-level node as a reference for network synchronization. However, in some cases, one or more secondary upper-level nodes may be configured for the first node, and a secondary upper-level node may be activated or configured through signaling to become a master upper-level node. In this scenario, a case in which the timing reference signal suddenly changes also occurs on the first node. Usually, the master upper-level node and the secondary upper-level node provide services for the first node at the same time.

Figure 7:
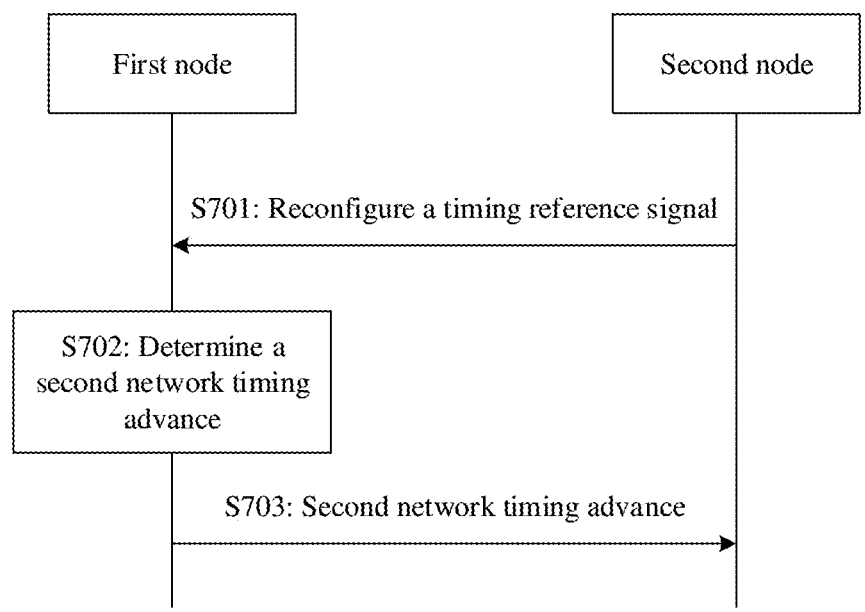
FIG. 7 is a flowchart of reconfiguring a timing reference signal by a second node according to an embodiment of this application.

FIG. 7 is a flowchart of reconfiguring a timing reference signal by a second node. When a timing reference signal of a first node is reconfigured by the second node, the first node determines a second network timing advance and sends the second network timing advance to the second node. The second network timing advance may be used by the second node to determine a backhaul resource configuration used when sending a signal to the first node, or may be used by the second node to reconfigure transmission timing information for the first node. Use of the second node after obtaining the second network timing advance is not limited in this application. A process is as follows.

S701: The second node reconfigures the timing reference signal for the first node. Specifically, the second node reconfigures the timing reference signal through an RRC message, and specifies a new timing reference signal during configuration. The newly configured timing reference signal includes at least one of the following information: a time-frequency resource, a QCL relationship, a sending period, a BWP to which the timing reference signal belongs, a waveform parameter, a start position or the like. The start position may further include at least one of a start frame number, a start subframe number, or a start slot number.

S702: The first node determines a second network timing advance. After receiving a timing reference signal reconfiguration message sent by the second node, the second node triggers a process in which the second node measures the newly configured timing reference signal. The process of measuring the timing reference signal is the same as a process of measuring a reference signal, and is well known to a person of ordinary skill in the art. Details are not described again. It should be understood that, herein, the second network timing advance is obtained after the new reference signal that is reconfigured by the second node and that has been sent is measured, and the second network timing advance cannot be measured and determined immediately after the timing reference signal reconfiguration message is received. A method for determining the second network timing advance is to determine a new timing reference by measuring the reconfigured timing reference signal, and calculate a difference between nominal frame timing and the new timing reference. The calculated difference is a new application timing advance of the first node, and the second network timing advance reported by the first node is a new application timing advance of the first node. In this way, it can be ensured that the nominal frame timing does not change.

The second network timing advance may be a positive number or a negative number, depending on a timing relationship between the timing reference and a downlink subframe. If the timing reference is after corresponding downlink frame timing, the second network timing advance is a positive number. If the timing reference is before the corresponding downlink frame timing, the second network timing advance is a negative number. If the timing reference is the same as the corresponding downlink frame timing, the second network timing advance may be 0, but usually, is a positive number.

S703: The first node reports the second network timing advance to the second node. The first node may report the second network timing advance to the second node through an RRC message or a MAC CE. Usually, the MAC CE may be used for quicker reporting. If the MAC CE is used for reporting, a MAC CE that sends a timing advance in an uplink direction needs to be redefined, and a format of the MAC CE may be the same as a format of a downlink MAC CE.

After the second node receives the second network timing advance sent by the first node, if a difference between the second network timing advance and the application timing advance of the first node is relatively large, the second node may need to re-determine a backhaul resource configuration used when sending a signal to the first node, or the second node may need to reconfigure transmission timing information for the first node, to adjust frame timing of the first node. If the second node reconfigures the transmission timing information, the first node adjusts the frame timing by using the method described in the embodiment in FIG. 6. That the second node re-determines the backhaul resource configuration used when sending the signal to the first node means that due to different application timing advances (that is, a difference between a sending frame and a receiving frame of the first node), sending and receiving collisions in different cases may occur between a backhaul link symbol of the second node and an access link symbol of the first node, and the second node needs to coordinate backhaul resources to avoid the conflicts. The following is a same case, and details are not described.

In a possible implementation, the first node may also report a difference between an original timing reference and the timing reference that is obtained by the first node based on the new timing reference signal, to reduce signaling transmission overheads. The original timing reference is a timing reference determined by a timing reference signal used before the timing reference signal of the first node is reconfigured. Specifically, after determining the timing reference obtained by the first node based on the new timing reference signal, the first node calculates the difference between the original timing reference and the timing reference that is obtained by the first node based on the new timing reference signal. For example, the original timing reference may be used as a reference, if the timing reference obtained by the first node based on the new timing reference signal is later than the original timing reference, the difference is a positive number. If the timing reference obtained by the first node based on the new timing reference signal is earlier than the original timing reference, the difference is a negative number. If the timing reference obtained by the first node based on the new timing reference signal is equal to the original timing reference, the difference is 0.

In a possible implementation, the second node may also configure a threshold N3. When the difference between the original timing reference and the timing reference that is obtained by the first node based on the new timing reference signal is less than the configured threshold N3, reporting is not needed. Optionally, the second node may define a timer. If the second node does not receive, within a specific time, the second network timing advance reported by the first node, it is considered that a difference between the second network timing advance and the first network timing advance is very small, and the backhaul resource configuration for the first node does not need to be readjusted.

In a reporting process, the first node may actively perform reporting (or actively request to perform reporting), or the second node performs reporting after configuration, or reporting may be triggered by an event. For example, reporting is performed after the timing reference signal is switched. It should be understood that reporting of the second network timing advance does not necessarily depend on reconfiguration of the timing reference signal.

In a possible implementation, the second node may configure a plurality of timing reference signals for the first node. Because the plurality of timing references may have different QCLs, timing references obtained by the first node based on the different timing reference signals may be different. The second node may enable the first node to report second network timing advances of the plurality of timing references. Each second network timing advance includes an application timing advance, and each application timing advance, that is, an advance of a nominal frame timing relative to the plurality of timing references, corresponds to one timing reference signal. Each timing reference is obtained by using a different timing reference signal. It should be understood that although the plurality of timing reference signals are configured by the second node, a sending node of the plurality of timing reference signals may be another node. In addition, actually, the plurality of reference signals may not be referred to as timing reference signals, but may be beam management reference signals, radio resource management reference signals, or the like (for example, a plurality of CSI-RSs) that need to be measured by the first node. To distinguish reference signals corresponding to the plurality of reported second network timing advances, when reporting the plurality of second network timing advances, the first node may carry corresponding reference signal identifier information (including a CSI-RS resource, an index of an SS/PBCH block, a reference signal, the node, and the like). It should be understood that, when reporting a single second network timing advance, the first node may also carry corresponding reference signal identifier information.

Through the plurality of second network timing advances reported by the first node, the second node may determine the backhaul resource configuration used when sending a signal to the first node, or the second node reconfigures transmission timing information for the first node. Use of the second node after obtaining the plurality of second network timing advances is not limited in this application.

According to the foregoing embodiment, when the timing reference signal of the first node is reconfigured by the second node, the application timing advance of the first node may be adjusted to ensure stability of the nominal frame timing of the first node. In addition, the first node may report the recalculated application timing advance to an upper-level node. Signaling overheads can be reduced through the enhanced solution.

In another case, in a process in which an upper-level node of the first node is switched from the second node to a third node, the first node determines a third network timing advance and may send the third network timing advance to the third node. The third network timing advance is used by the third node to determine the backhaul resource configuration used when sending a signal to the first node, or may be used by the third node to reconfigure the transmission timing information for the first node. Use of the third node after obtaining the third network timing advance is not limited in this application.

In this embodiment, in addition to the foregoing timing obtaining method, nominal frame timing may also be obtained by a relay node according to another method (for example, obtained through a GPS). In this case, the relay node may calculate an equivalent application timing advance Tp through the nominal frame timing and the timing reference.

In this embodiment, the third network timing advance is an advance of the nominal frame timing of the first node relative to a timing reference determined by a timing reference signal of the third node. This is similar to the second network timing advance in Embodiment 7.

Figure 8A:
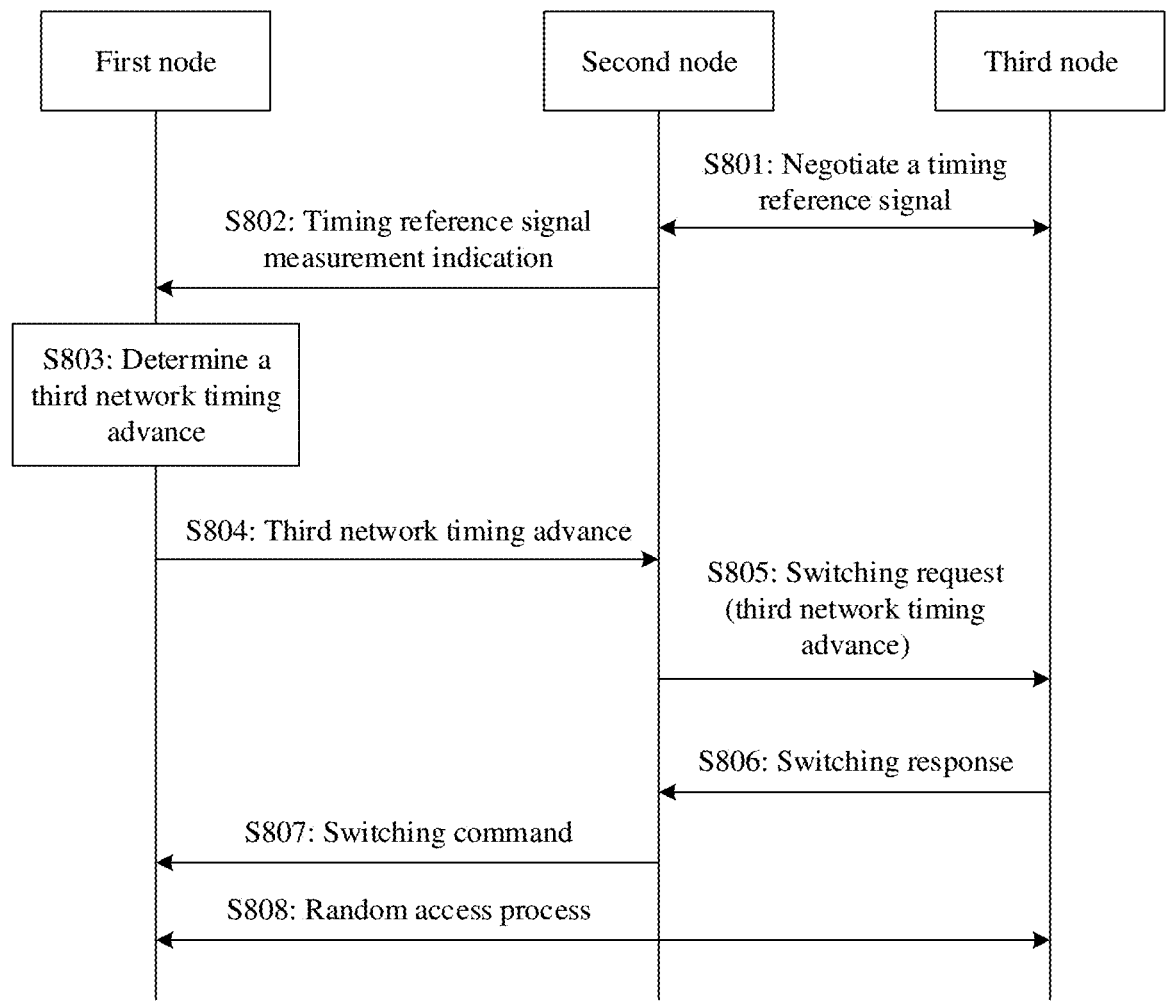
FIG. 8(a) and FIG. 8(b) are flowcharts in which a first node directly sends a third network timing advance to a third node according to an embodiment of this application.

FIG. 8(a) is a flowchart in which a first node sends a third network timing advance to a third node through a second node. Steps are as follows.

S801: The second node and the third node negotiate a timing reference signal. The second node requests the third node to configure a timing reference signal for the first node. A configuration parameter of the timing reference signal is described above, and details are not described again. It should be understood that in some scenarios, the first node may alternatively measure the timing reference signal of the third node, for example, measure an SS/PBCH block of the third node, and the second node does not need to negotiate with the third node. In this case, the first node may determine the third network timing advance based on the measured timing reference signal.

S802: The second node sends a timing reference signal measurement indication to the first node. The timing reference signal measurement indication includes the timing reference signal configured by the third node. The second node may not parse the timing reference signal configured by the third node. Certainly, the second node may alternatively parse the timing reference signal configured by the third node. This is not limited in this application. After receiving the timing reference signal measurement indication, the first node obtains the configuration parameter of the timing reference signal of the third node, and starts to monitor the timing reference signal of the third node or monitors the timing reference signal of the third node within a configured time range. If the second node and the third node do not negotiate the timing reference signal in step S801, step S802 is not mandatory. In this case, the first node measures the timing reference signal of the third node.

S803: The first node determines the third network timing advance. The first node determines the third network timing advance after detecting the timing reference signal of the third node. It should be understood that, before determining the third network timing advance, the first node receives the timing reference signal sent by the third node. In addition, the first node uses the second node as a primary upper-level node, and continues to monitor a timing reference signal of the second node. A method for determining the third network timing advance is the same as that for determining the second network timing advance, and a difference lies in that the used timing reference signals are different. Details are not described again.

S804: The first node sends the third network timing advance to the second node. Similarly, the third network timing advance may be sent to the second node through an RRC message or a MAC CE. Because this is a switching process, the third network timing advance may be sent through the RRC message. If the third network timing advance is sent through the MAC CE, the corresponding timing reference signal needs to be specified in the MAC CE. A specific design of the MAC CE depends on implementation. This is not limited in this application. In addition, if the third network timing advance is sent through the MAC CE, the second node needs to convert the third network timing advance into an RRC message, and send the third network timing advance to the third node through a switching request.

S805: The second node sends the switching request to the third node, where the switching request includes the third network timing advance.

S806: The third node sends a switching response to the second node. The switching process is well known to a person of ordinary skill in the art, and is not described in detail herein.

S807: The second node sends a switching command to the first node. The switching command includes an initial access parameter of the third node. The process is well known to a person of ordinary skill in the art, and is not described in detail herein.

S808: The first node accesses the third node by using a random access process. The random access process may be contention-based random access, or may be non-contention-based random access. The random access process is well known to a person of ordinary skill in the art, and is not described in detail herein.

In a possible implementation, step 804 may also include a difference between a timing reference determined by the timing reference signal and an original timing reference of the third node. After receiving the difference that is between the timing reference determined by the timing reference signal and the original timing reference of the third node and that is reported by the first node, the second node calculates the third network timing advance based on the first network timing advance, and sends the calculated third network timing advance to the third node. The original timing reference herein is a timing reference determined based on the timing reference signal of the second node. Herein, because the third node does not have information about a first network timing advance, the third node needs to obtain the first network timing advance of the first node. A method for determining the third network timing advance is determining a timing reference of the third node by measuring the timing reference signal of the third node, and calculating the difference between the timing reference and the original timing reference of the third node. The calculated difference is the third network timing advance.

Figure 8B:
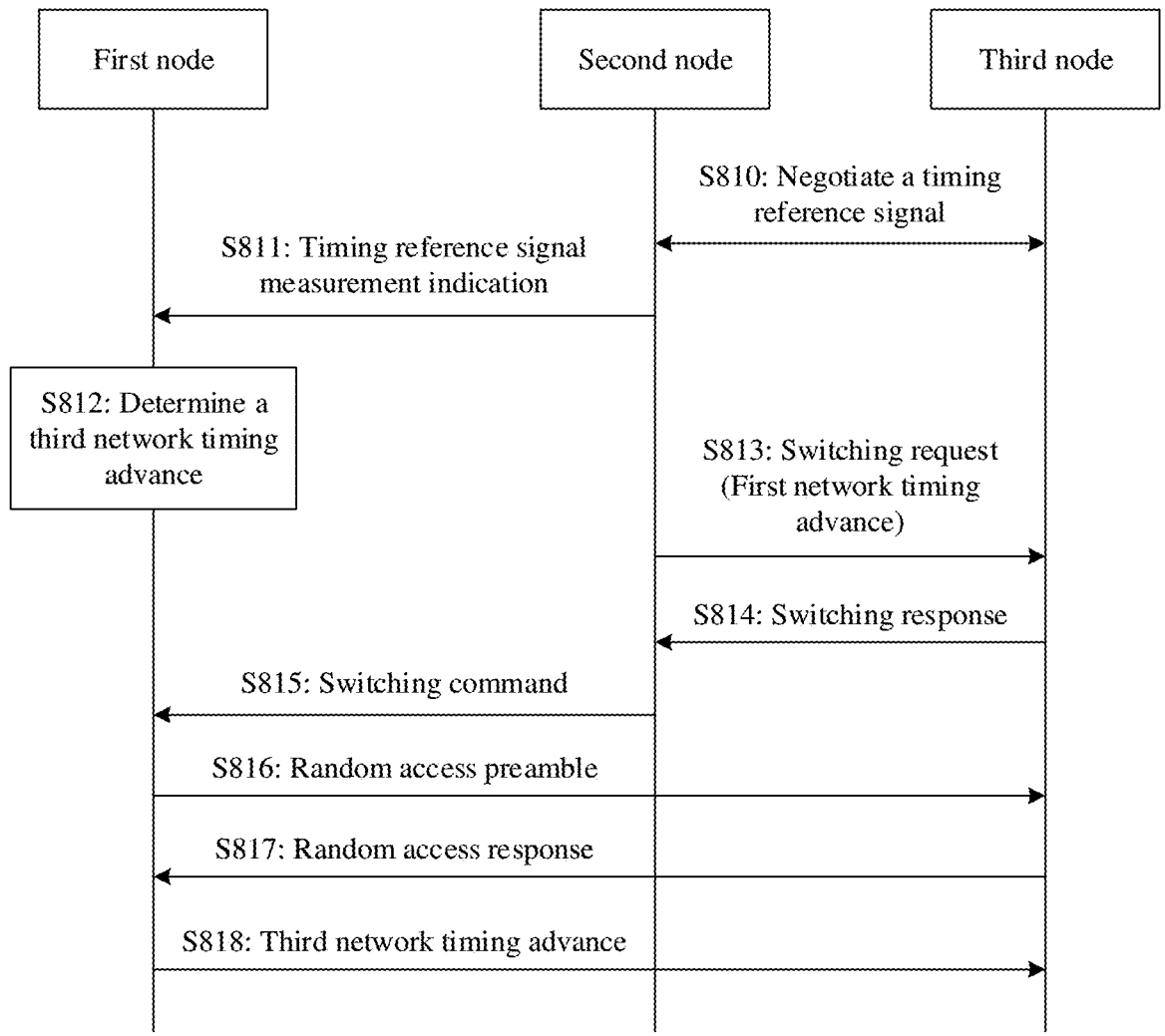

FIG. 8(*b*) is a flowchart in which a first node directly sends a third network timing advance to a third node. Steps are as follows.

S810 to S812 are the same as S801 to S803, and details are not described again.

S813: The second node sends a switching request to the third node. The switching request may carry a first network timing advance, mainly considering that if the first node uses a difference reporting manner, the first network timing advance needs to be used to calculate the third network timing advance. If the first node reports the third network timing advance to the third node, the first network timing advance does not need to be sent in the switching request. This specifically depends on implementation or a protocol definition, and is not limited in this application.

S814 and S815 are respectively the same as S806 and S807, and details are not described again.

S816: The first node sends a random access preamble to the third node. Non-contention-based random access is used as an example herein.

S817: The third node sends a random access response to the first node. Because non-contention-based random access is performed, a random access process is completed through the random access response, and an uplink transmission resource is scheduled for the first node in the random access response.

S818: The first node sends the third network timing advance on the uplink resource scheduled in the random access response. As described above, if the second node sends the first network timing advance to the third node, the first node may send a difference between the third network timing advance and the first network timing advance herein; otherwise, the first node needs to send the third network timing advance.

According to the foregoing embodiment, a network timing advance between the first node and the third node is determined in a switching process, so that a process of network synchronization is shortened, and data transmission between the first node and the third node is accelerated.

In another possible implementation, the first node determines a frame timing adjustment amount when the timing reference signal is reconfigured; and the first node sends, through a system message or a dedicated message, frame timing update information to a lower-level node served by the first node, where the frame timing update information includes the frame timing adjustment amount of the first node. The reconfiguration herein includes a case in which the second node reconfigures the timing reference signal and a case in which the upper-level node of the first node is switched from the second node to the third node.

Correspondingly, the terminal receives a system message or a dedicated message sent by a first node, where the system message or the dedicated message includes the frame timing update information of the first node, and the frame timing update information includes the frame timing adjustment amount of the first node; and the terminal adjusts a timing advance for uplink transmission of the terminal based on the frame timing adjustment amount of the first node.

Figure 9:
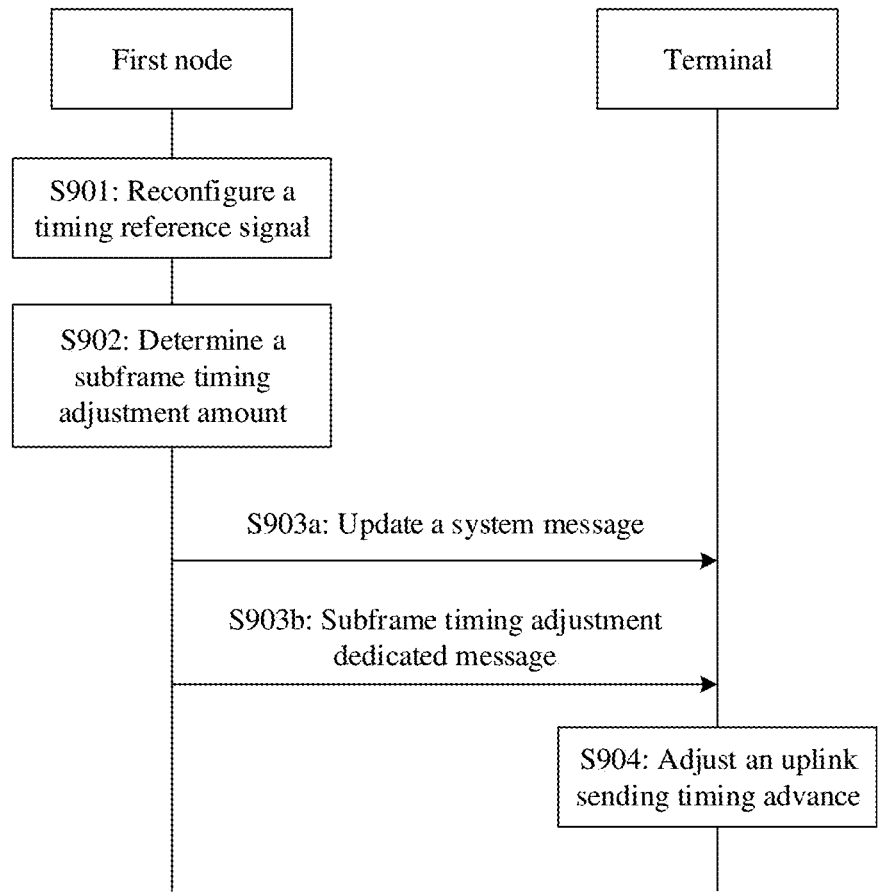
FIG. 9 is a flowchart of adjusting frame timing by a first node according to an embodiment of this application.

FIG. 9 is a flowchart of adjusting frame timing by a first node. Steps are as follows.

S901: A timing reference signal of the first node is reconfigured. The reconfiguration herein includes a scenario in which a second node configures a new timing reference signal for the first node, or a scenario in which a change of an upper-level node of the first node causes a change of the timing reference signal.

S902: The first node determines a frame timing adjustment amount. The determining a frame timing adjustment amount herein means that the first node re-determines a difference between frame timing and original frame timing of the first node based on the reconfigured timing reference signal. The frame timing adjustment amount is a deviation between the new frame timing and the original frame timing, and the deviation may be a positive number, may be a negative number, or may be 0. If the frame timing adjustment amount is 0, a subsequent process does not need to be performed. If the new frame timing is earlier than the original frame timing, the deviation is a negative number. If the new frame timing is later than the original frame timing, the deviation is a positive number.

S903*a*: The first node sends, through a system message, a broadcast message to a terminal served by the first node. The system message herein may be a system message itself. For example, the terminal served by the first node may be notified through a system information block (SIB), or through a system message update process. Whether to perform sending through the system message or through the system message update process depends on a protocol definition or implementation, and is not limited in this application. If the notification is performed through system message update, the update process may last for a period of time, for example, dozens of milliseconds. The frame timing adjustment amount is notified through the system message, mainly to notify that a terminal in an idle state or an inactive state may perform uplink sending timing update. Otherwise, the uplink sending of the terminal, especially the uplink sending of the terminal in the inactive state, may be affected. The system message includes frame timing update information, and the frame timing update information includes a frame timing adjustment amount of the first node. If the notification is performed through the system message, there should be a mechanism for the terminal to read the system message. For example, the notification is performed through a paging message, or the notification is performed through a dedicated message. The paging message is mainly used to notify the terminal in the idle mode or the inactive mode, and the dedicated message is mainly used to notify a terminal in a connected state.

S903*b*: The first node sends a frame timing adjustment dedicated message to the terminal in the connected state. The message may be sent through an RRC message or through a MAC CE. If the message is sent through a MAC CE, a MAC CE of a frame timing adjustment amount needs to be redefined. For a specific definition, refer to a timing advance, and this is not limited in this application.

S904: The terminal adjusts an uplink sending timing advance. After receiving a system message, to indicate a frame timing update message or the frame timing adjustment dedicated message, the terminal adjusts the uplink sending timing advance. Specifically, a new uplink sending timing advance may be obtained by adding a frame timing adjustment amount in frame timing update information and the existing uplink sending timing advance of the terminal. It should be understood that, the frame timing adjustment amount is an offset relative to original frame timing, and the terminal determines a timing reference through downlink receiving. Downlink receiving timing of the terminal changes due to a change of the frame timing, and the timing change can be detected by the terminal. Therefore, obtaining of the downlink receiving timing depends on detection of a downlink synchronization signal by the terminal.

It should be understood that, in this embodiment, the second node and the third node may have a same function, that is, the second node also includes a function of the third node, and the third node also includes a function of the second node. Because there may be a plurality of first nodes in an IAB system, the second node may be a third node relative to some first nodes, and the third node may be a second node relative to some first nodes. Here, the two upper-level nodes are distinguished for the convenience of description herein.

According to the foregoing embodiment, when the timing reference signal of the first node is reconfigured, the frame timing is adjusted at a time through a broadcast message and/or a dedicated message, a problem of the uplink sending timing advance of the terminal is resolved, and a system design is simplified. Real-time adjustment can improve system performance and avoid a problem that spectral efficiency is reduced because data cannot be transmitted on some symbols in an excessively slow adjustment process.

In some cases, the second node may adjust the frame timing of the first node, and the second node adjusts the frame timing through a network timing reconfiguration message. The network timing reconfiguration message includes a fourth network timing advance and/or a maximum timing adjustment amount or a minimum timing adjustment amount in a unit time. The fourth network timing advance is used by the first node to determine the frame timing. For a specific adjustment method, refer to the method in the embodiment in FIG. 6. Details are not described again. Network timing (frame timing) of the first node is readjusted, so that utilization of a symbol between the first node and an upper-level node can be increased, and spectral efficiency can be improved. In addition, network synchronization precision can also be improved.

The foregoing mainly describes, from a perspective of interaction between the network elements, the solutions provided in the embodiments of this application. It may be understood that to implement the foregoing functions, each network element, for example, the first node, the second node, or the terminal, includes corresponding hardware structures and/or software modules for performing the functions. A person of ordinary skill in the art should easily be aware that, in combination with the examples described in the embodiments disclosed in this specification, network elements and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first node, the second node, the third node, and the terminal may be divided into functional modules based on the foregoing method examples. For example, functional modules may be obtained through division based on corresponding functions, or at least two functions may be integrated into one processing module. The integrated module may be implemented in a form of hardware, or may be implemented in a form of a software functional module. It should be noted that, in the embodiments of this application, the division into modules is an example, and is merely a logical function division. In an actual implementation, another division manner may be used.

Figure 10:
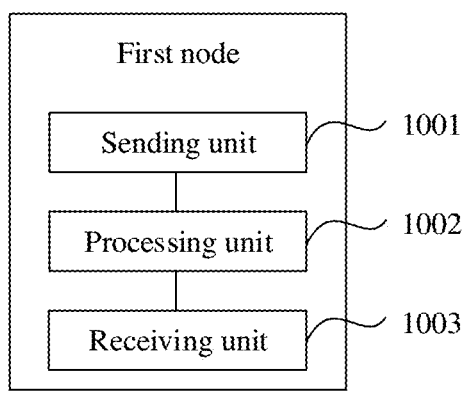
FIG. 10 is a possible schematic structural diagram of a first node according to an embodiment of this application.

When each function module is obtained through division based on each corresponding function, FIG. 10 is a possible schematic structural diagram of the first node in the foregoing embodiment according to an embodiment of this application. The first node includes a receiving unit 1003 and a processing unit 1002. The receiving unit 1003 is configured to perform S402 in FIG. 4, one or more steps in S501, S502, and S504 in FIG. 5; step S701 in FIG. 7, or one or more steps in S802, S807, S808, S811, S815 and S817 in FIG. 8. The processing unit 1002 is configured to perform S403 in FIG. 4, step S505 in FIG. 5, one or more steps in S601, S602, and S603 in FIG. 6, step S702 in FIG. 7, one or more steps in S803 and S812 in FIG. 8, or one or more steps in S901 and S902 in FIG. 9. The first node may further include a sending unit 1001, configured to support the first node in performing step S503 in FIG. 5, step S703 in FIG. 7, one or more steps in S804 and S816 in FIG. 8, or one or more steps in S903a and S903b in FIG. 9.

Figure 11:
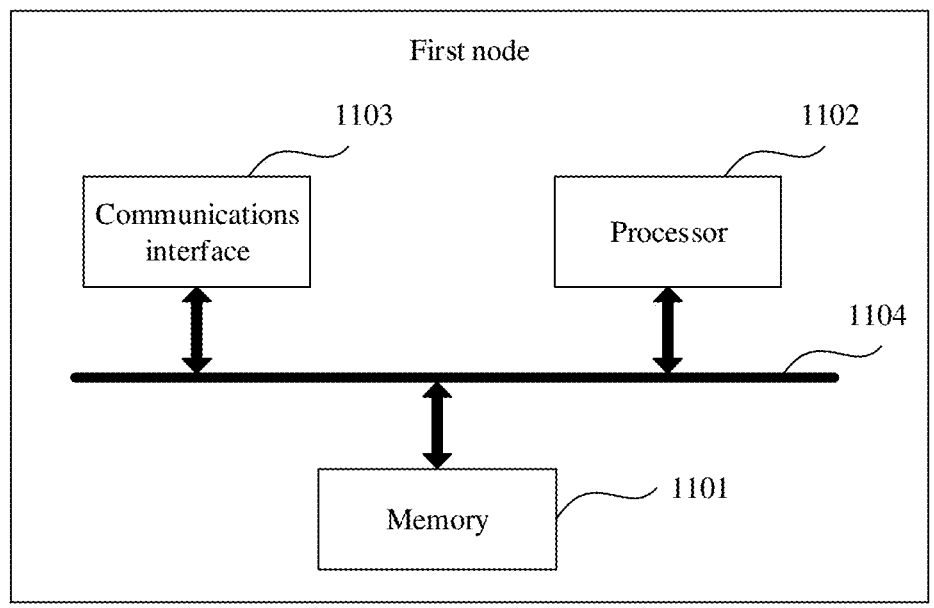
FIG. 11 is a possible schematic diagram of a logical structure of a first node according to an embodiment of this application.

In hardware implementation, the processing unit 1002 may be a processor 1102 shown in FIG. 11. The receiving unit 1003 may be a receiver, and the sending unit 1001 may be a transmitter. The receiver and the transmitter may be integrated together to form a communications interface 1103 shown in FIG. 11. The communications interface may also be referred to as a transceiver. In addition, referring to what is shown in FIG. 11, the first node may further include a memory 1101. The processor 1102, the communications interface 1103, and the memory 1101 may be connected to each other, or may be connected to each other by using a bus 1104. The communications interface 1103 is configured to support the first node in communicating with a terminal, a second node, or a third node. The memory 1101 is configured to store program code or a parameter used for frame timing, for example, an offset in transmission timing information or a granularity of an offset in transmission timing information. When invoking the program code stored in the memory 1101, the processor 1102 performs the foregoing steps implemented by the processing unit 1002. The memory 1101 and the processor 1102 may be two separate hardware entities, or may be coupled together to form one hardware entity.

Figure 12:
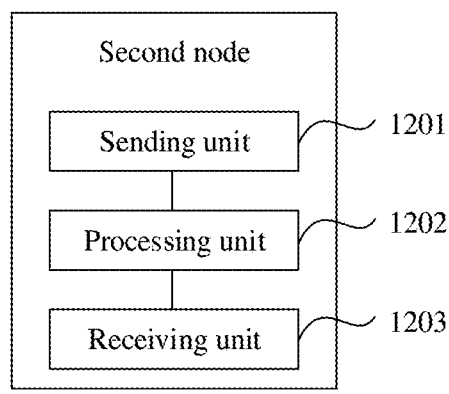
FIG. 12 is a possible schematic structural diagram of a second node according to an embodiment of this application.

When each function module is obtained through division based on each corresponding function, FIG. 12 is a possible schematic structural diagram of the second node in the foregoing embodiment according to an embodiment of this application. The second node includes at least a processing unit 1202 and a sending unit 1201. The processing unit 1202 is configured to perform S401 in FIG. 4. The sending unit 1201 is configured to perform S402 in FIG. 4, one or more steps in S501, S502, and S504 in FIG. 5, step S701 in FIG. 7, or one or more steps in S801, S802, S805, S807, S810, S811, S813 and S815 in FIG. 8. The second node may further include a receiving unit 1102, configured to perform S503 in FIG. 5, step S703 in FIG. 7, or one or more steps in S801, S804, S806, S810, and S814 in FIG. 8.

Figure 13:
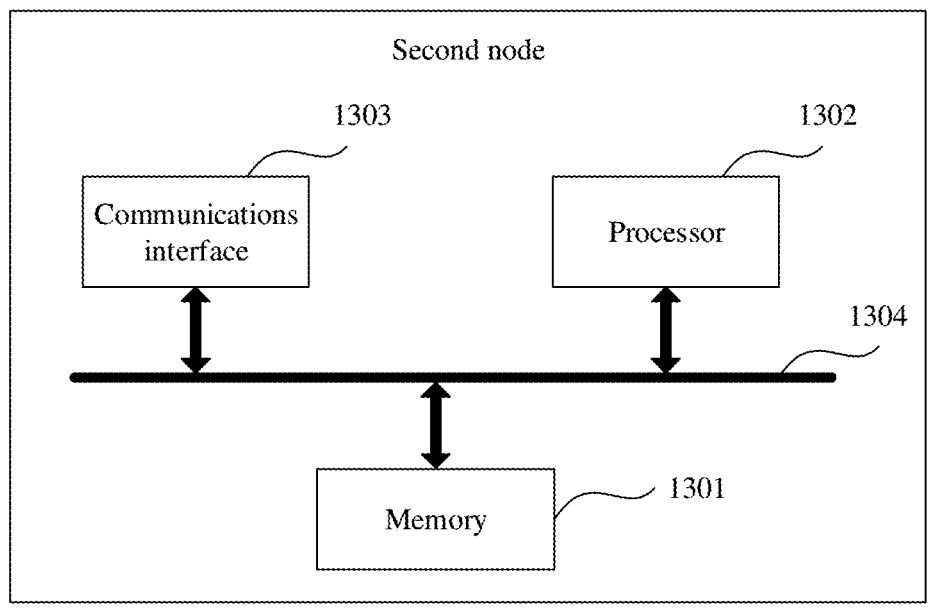
FIG. 13 is a possible schematic diagram of a logical structure of a second node according to an embodiment of this application.

In hardware implementation, the processing unit 1202 may be a processor 1302 shown in FIG. 13. The sending unit 1201 may be a transmitter, and the receiving unit 1203 may be a receiver. The receiver and the transmitter may form a communications interface 1303 shown in FIG. 13. The communications interface may also be referred to as a transceiver. In addition, referring to what is shown in FIG. 13, the second node may further include a memory 1301. The processor 1302, the communications interface 1303, and the memory 1301 may be connected to each other, or may be connected to each other by using a bus 1304. The communications interface 1303 is configured to support the second node in communicating with a terminal, a third node, or a gateway. For example, a third network node performs communication by using a wired connection or a wireless connection. For example, during switching, the second node exchanges information with the third node through a communications interface, and the communications interface 1303 also includes the interface. The memory 1301 is configured to store program code or a parameter used for frame timing, for example, a size of a guard gap used during mutual conversion between an uplink subframe and a downlink subframe, an offset in transmission timing information, or a granularity of an offset in transmission timing information. When invoking the program code stored in the memory 1301, the processor 1302 performs the foregoing steps implemented by the processing unit 1202. The memory 1301 and the processor 1302 may be two separate hardware entities, or may be coupled together to form one hardware entity.

Figure 14:
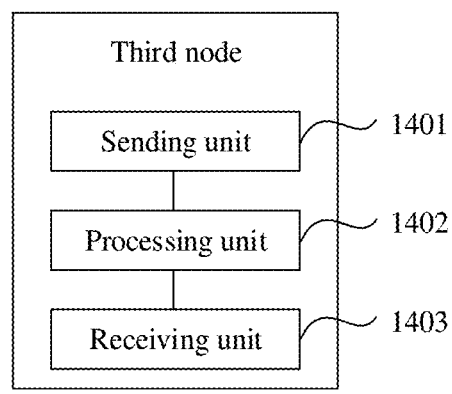
FIG. 14 is a possible schematic structural diagram of a third node according to an embodiment of this application.

When each function module is obtained through division based on each corresponding function, FIG. 14 is a possible schematic structural diagram of the third node in the foregoing embodiment according to an embodiment of this application. The third node includes a processing unit 1402 and a receiving unit 1403. The processing unit 1402 is configured to configure a timing reference signal for the first node. For a method for configuring the timing reference signal, refer to the description in the foregoing method embodiment. Details are not described herein again. The receiving unit 1403 is configured to perform one or more steps in S801, S805, S808, S810, S813, S816 and S818 in FIG. 8. The third node may further include a sending unit 1401, configured to perform one or more steps in S801, S806, S808, S810, S814 and S817 in FIG. 8.

Figure 15:
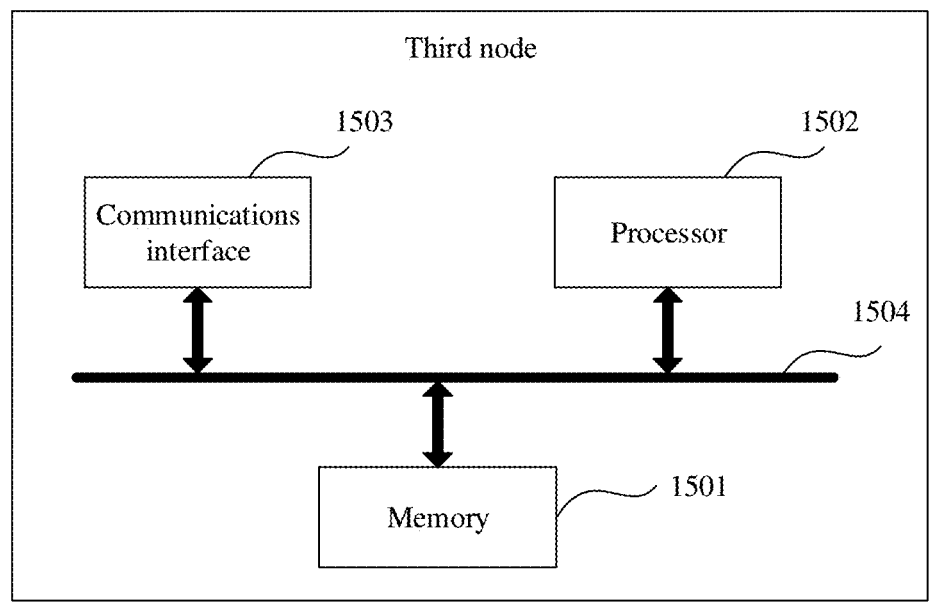
FIG. 15 is a possible schematic diagram of a logical structure of a third node according to an embodiment of this application.

In hardware implementation, the processing unit 1402 may be a processor 1502 shown in FIG. 15. The sending unit 1401 may be a transmitter, and the receiving unit 1403 may be a receiver. The receiver and the transmitter may form a communications interface 1503 shown in FIG. 15.

In addition, referring to what is shown in FIG. 15, the third node may further include a memory 150. The processor 1502, the communications interface 1503, and the memory 1501 may be connected to each other, or may be connected to each other by using a bus 1504. The communications interface 1503 is configured to support the third node in communicating with a terminal or another node. Communication with the another node includes communication with a second node or communication with a gateway. Communication with the second node may be performed through a wired interface or may be performed through a wireless interface. Communication with the gateway may be mainly performed through a wired interface. The communications interface also includes the interfaces used when communicating with these nodes. The memory 1501 is configured to store program code for the third node or a parameter used for frame timing, for example, a size of a guard gap used during mutual conversion between an uplink subframe and a downlink subframe, an offset in transmission timing information, or a granularity of an offset in transmission timing information. When invoking the program code stored in the memory 1501, the processor 1502 performs the foregoing steps implemented by the processing unit 1402. The memory 1501 and the processor 1502 may be two separate hardware entities, or may be coupled together to form one hardware entity.

Figure 16:
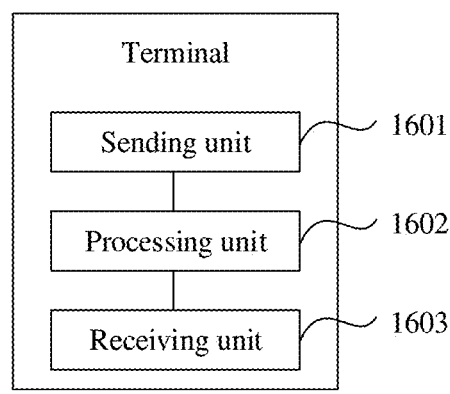
FIG. 16 is a possible schematic structural diagram of a terminal according to an embodiment of this application.

When each function module is obtained through division based on each corresponding function, FIG. 16 is a possible schematic structural diagram of the terminal in the foregoing embodiment according to an embodiment of this application. The terminal includes a processing unit 1602 and a receiving unit 1603. The processing unit 1602 is configured to perform S904 in FIG. 9. The receiving unit 1603 is configured to perform steps in S903a and S903b in FIG. 9. The terminal may further include a sending unit 1601, configured to support the terminal in sending data or a signal to the first node, the second node, and the third node.

Figure 17:
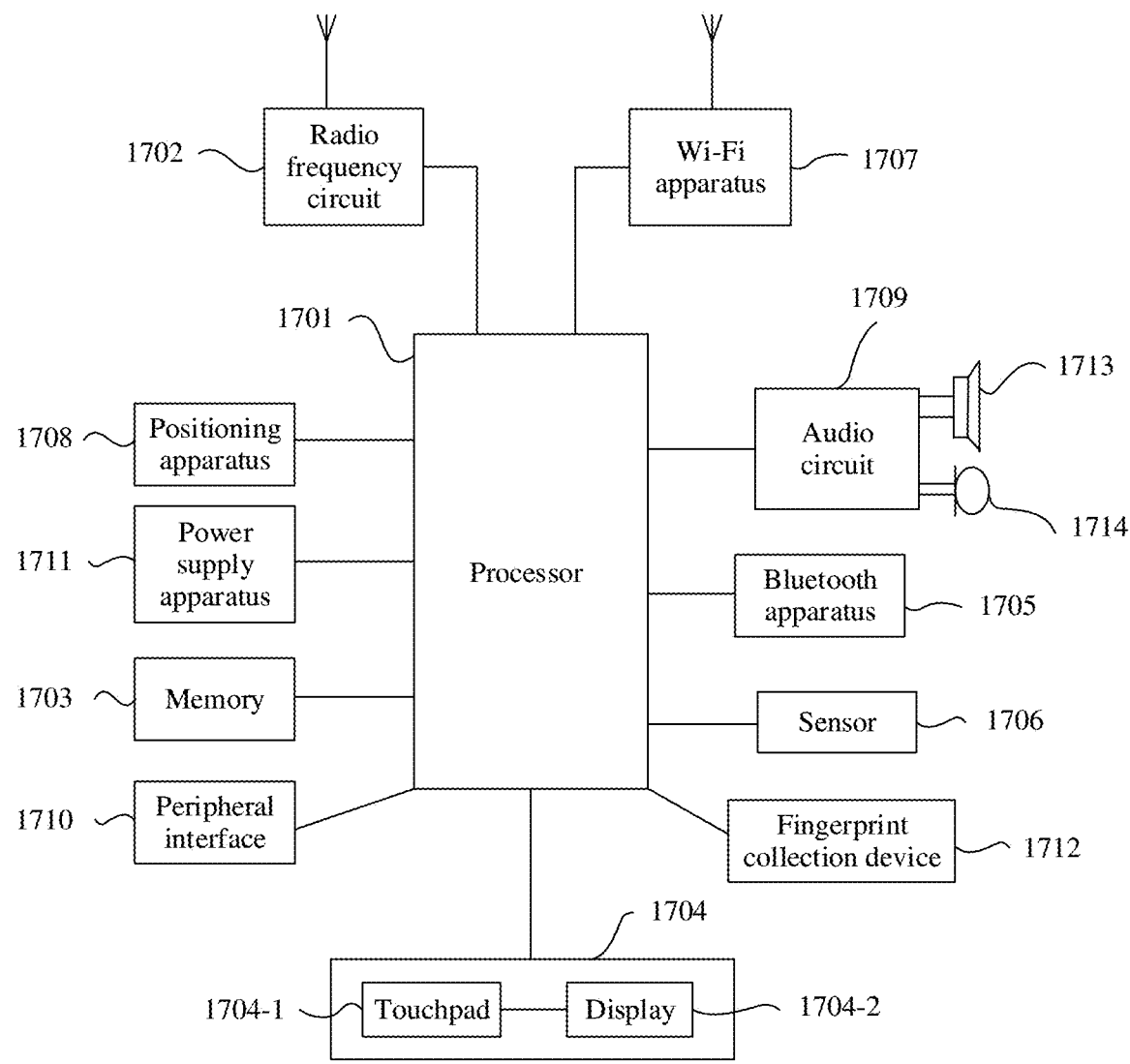
FIG. 17 is a possible schematic diagram of a logical structure of a terminal according to an embodiment of this application.

In hardware implementation, the processing unit 1602 may be the processor 1701 shown in FIG. 17. The receiving unit 1603 and the sending unit 1601 may be a radio frequency circuit 1702 shown in FIG. 17. The terminal may further include a memory 1703. In addition, the terminal may further include components such as a touchscreen 1704, a Bluetooth apparatus 1705, one or more sensors 1706, a wireless fidelity Wi-Fi apparatus 1707, a positioning apparatus 1708, an audio circuit 1709, a peripheral interface 1710, and a power supply apparatus 1711. Because these components are all the prior art, details are not described herein. These components may communicate through one or more communications buses or signal lines (not shown in FIG. 17). A person skilled in the art may understand that a hardware structure shown in FIG. 17 does not constitute a limitation on the terminal. The terminal may include more or fewer components than those shown in the figure, or combine some components, or have different component arrangements. The radio frequency circuit 1702, the Bluetooth apparatus 1705, or the wireless fidelity Wi-Fi apparatus 1707 is configured to support the terminal in communicating with another device. The memory 1703 is configured to store program code and data of the terminal. The processor 1701 invokes the code stored in the memory 1703 to perform control management. The memory 1703 may be coupled to or not coupled to the processor. Although not shown in FIG. 17, the terminal may further include a camera (a front-facing camera and/or a rear-facing camera), a flash, a micro projection apparatus, a near field communication NFC apparatus, and the like. Details are not described herein.

The processor 1102, 1302, 1502, or 1701 mentioned in the foregoing embodiment may be a central processing unit, a general purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 11, FIG. 13, and FIG. 15, but this does not mean that there is only one bus or only one type of bus.

In another embodiment of this application, a readable storage medium is further provided. The readable storage medium stores a computer instruction. When a processor in a device (a node or a terminal) reads the computer instruction in the readable storage medium, steps performed by the processor in the device (the node or the terminal) in the foregoing embodiment are implemented. The foregoing readable storage medium may include any medium that can store program code, such as a USB flash drive, a removable hard disk, a read-only memory, a random access memory, a magnetic disk, or an optical disc.

In another embodiment of this application, a computer program product is further provided. The computer program product includes a computer instruction stored in the foregoing computer-readable storage medium.

In another embodiment of this application, a communications system is further provided. The communications system includes a plurality of devices, and the plurality of devices include a first node, a second node, a third node, and a terminal. The first node may be the first node provided in FIG. 10 or FIG. 11, and is configured to perform the steps of the first node in the method for implementing network synchronization provided in FIG. 4 to FIG. 9, and/or the second node may be the second node provided in FIG. 12 or FIG. 13, and is configured to perform the steps implemented by the second node in FIG. 4, FIG. 5, FIG. 7, or FIG. 8, and/or the third node may be the third node provided in FIG. 14 or FIG. 15, and is configured to perform the steps implemented by the third node in FIG. 9, and/or the terminal may be the terminal provided in FIG. 16 or FIG. 17, and is configured to perform the steps implemented by the terminal in FIG. 9. It should be understood that the communications system may include a plurality of first nodes, and the plurality of first nodes perform a same or similar function. One first node may include a plurality of upper-level nodes. At least one upper-level node (such as the second node) is a primary upper-level node of the first node. The first node may have a plurality of third nodes (secondary upper-level nodes). The second node and the third node may have same functions, and execute different functions when being used as different roles.

In this embodiment of this application, when the first node receives transmission timing information sent by the second node, the first node determines frame timing of the first node based on the transmission timing information. When an actual network timing advance of the first node changes, the first node may automatically adjust the frame timing. Alternatively, when a timing reference signal of the first node changes, the first node re-determines a network timing advance, and reports the re-determined network timing advance to the second node or the third node, or the first node re-determines the frame timing based on the re-determined network timing advance, and sends a system message update message and/or a dedicated message to a terminal served by the first node, to notify the terminal of a frame timing adjustment amount, so that the terminal may readjust uplink sending timing. In the foregoing solution, a network synchronization problem caused by a change of the timing reference signal or a change of the timing advance is avoided, and interference caused by a synchronization problem between nodes is avoided, thereby improving spectrum resource efficiency of an entire relay system.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
receiving, by a first node, transmission timing information sent by a second node, wherein the transmission timing information comprises a first network timing advance and a timing offset, wherein each configuration granularity of the timing offset is an integer multiple of $T_c$, $T_c$, $=1/(480*10^3*4096)$s, wherein a configuration granularity of the timing offset in an FR1 frequency band is $A*T_c$, wherein a configuration granularity of the timing offset in an FR2 frequency band is $B*T_c$, wherein the value of A is different from the value of B, wherein A is one of 16, 32, 64, 2*64, 4*64,8*64 or 16*64, wherein B is one of 16, 32, 64, 2*64, 4*64,8*64 or 16*64, and wherein the second node is an upper-level node of the first node; and
determining, by the first node, frame timing of the first node based on the first network timing advance and the timing offset, wherein the frame timing comprises a downlink frame sending time of the first node, wherein the downlink frame is a frame sent to a third node, and wherein the third node is a relay node or a terminal.

2. The method according to claim 1, wherein before receiving, by the first node, the transmission timing information, the method further comprises:
sending, by the first node, timing capability information or a timing configuration request to the second node, wherein the timing capability information indicates a capability of the first node to support a global positioning system, and the timing configuration request requests the second node to send the transmission timing information to the first node.

3. The method according to claim 1, further comprising:
when the first node detects that an absolute value of a difference between an actual network timing advance and an application timing advance is greater than a first threshold N1, adjusting, by the first node based on a second threshold N2, the frame timing determined based on the transmission timing information, wherein the second threshold N2 is predefined or configured by the second node, the second threshold N2 indicates a maximum timing adjustment amount or a minimum timing adjustment amount of the first node in a unit of time, and the application timing advance is determined based on the first network timing advance.

4. The method according to claim 1, further comprising:
when a timing reference signal of the first node is reconfigured by the second node, determining, by the first node, a second network timing advance, and sending the second network timing advance to the second node.

5. A method, comprising:
determining, by a second node, a first network timing advance and a timing offset of a first node, wherein the second node is an upper-level node of the first node; and sending, by the second node, transmission timing information to the first node, wherein the transmission timing information comprises the first network timing advance and the timing offset, wherein each configuration granularity of the timing offset is an integer multiple of $T_c$, $T_c=1/(480*10^3*4096)$s, wherein a configuration granularity of the timing offset in an FR1 frequency band is $A*T_c$, wherein a configuration granularity of the timing offset in an FR2 frequency band is $B*$, wherein the value of A is different from the value of B, wherein A is one of 16, 32, 64, 2*64, 4*64,8*64 or 16*64, wherein B is one of 16, 32, 64, 2*64, 4*64,8*64 or 16*64, wherein the first network timing advance and the timing offset are usable by the first node to determine frame timing, and wherein the frame timing comprises a downlink frame sending time of the first node;

wherein the downlink frame is a frame sent to a third node, and wherein the third node is a relay node or a terminal.

6. The method according to claim 5, wherein before sending, by the second node, the transmission timing information, the method further comprises:

receiving, by the second node, timing capability information or a timing configuration request sent by the first node, wherein the timing capability information indicates a capability of the first node to support a global positioning system, and the timing configuration request requests the second node to send the transmission timing information to the first node.

7. The method according to claim 5, further comprising:
configuring, by the second node, a second threshold N2 for the first node, wherein the second threshold N2 indicates a maximum timing adjustment amount or a minimum timing adjustment amount of the first node in a unit of time.

8. The method according to claim 5, further comprising:
reconfiguring, by the second node, a timing reference signal of the first node; and
receiving, by the second node, a second network timing advance sent by the first node.

9. A timing apparatus, wherein the timing apparatus is applied to a first node, and the timing apparatus comprises:
a transceiver, configured to receive transmission timing information sent by a second node, wherein the transmission timing information comprises a first network timing advance and a timing offset, wherein each configuration granularity of the timing offset is an integer multiple of $T_c$, $T_c=1/(480*10^3*4096)$s, wherein a configuration granularity of the timing offset in an FR1 frequency band is $A*T_c$, wherein a configuration granularity of the timing offset in an FR2 frequency band is $B*T_c$, wherein the value of A is different from the value of B, wherein A is one of 16, 32, 64, 2*64, 4*64,8*64 or 16*64, wherein B is one of 16, 32, 64, 2*64, 4*64,8*64 or 16*64, and wherein the second node is an upper-level node of the first node; and
a processor, configured to:
determine frame timing of the first node based on the first network timing advance and the timing offset, wherein the frame timing comprises a downlink frame sending time of the first node, and wherein the downlink frame is a frame sent to a third node, and wherein the third node is a relay node or a terminal.

10. The timing apparatus according to claim 9, wherein the transceiver is further configured to:
send timing capability information or a timing configuration request to the second node, wherein the timing capability information indicates a capability of the first node to support a global positioning system, and the timing configuration requests the second node to send the transmission timing information to the first node.

11. The timing apparatus according to claim 9, wherein the processor is further configured to:
when the first node detects that an absolute value of a difference between an actual network timing advance and an application timing advance is greater than a first threshold N1, adjust, based on a second threshold N2, the frame timing determined based on the transmission timing information, wherein the second threshold N2 is predefined or configured by the second node, the second threshold N2 indicates a maximum timing adjustment amount or a minimum timing adjustment amount of the first node in a unit of time, and the application timing advance is determined based on the first network timing advance.

12. The timing apparatus according to claim 9, wherein the processor is further configured to:
when a timing reference signal of the first node is reconfigured by the second node, determine a second network timing advance; and
wherein the transceiver is further configured to send the second network timing advance to the second node.

13. A timing apparatus, wherein the timing apparatus is applied to a second node and the timing apparatus comprises:
a processor, configured to determine a first network timing advance and a timing offset of a first node, wherein the second node is an upper-level node of the first node; and
a transceiver, configured to send the transmission timing information to the first node, wherein the transmission timing information comprises the first network timing advance and the timing offset, wherein each configuration granularity of the timing offset is an integer multiple of $T_c$, $T_c=1/(480*10^3*4096)$s, wherein a configuration granularity of the timing offset in an FR1 frequency band is $A*T_c$, wherein a configuration granularity of the timing offset in an FR2 frequency band is $B*T_c$, wherein the value of A is different from the value of B, wherein A is one of 16, 32, 64, 2*64, 4*64,8*64 or 16*64, wherein B is one of 16, 32, 64, 2*64, 4*64,8*64 or 16*64, wherein the first network timing advance and the timing offset are usable by the first node to determine frame timing, and wherein the frame timing comprises a downlink frame sending time of the first node;

wherein the downlink frame is a frame sent to a third node, and wherein the third node is a relay node or a terminal.

14. The timing apparatus according to claim 13, wherein the transceiver is further configured to:
before the transmission timing information is sent, receive timing capability information or a timing configuration request sent by the first node, wherein the timing capability information indicates a capability of the first node to support a global positioning system, and the timing configuration request requests the second node to send the transmission timing information to the first node.

15. The timing apparatus according to claim 13, wherein the transceiver is further configured to configure a second threshold N2 for the first node, wherein the second threshold N2 indicates a maximum timing adjustment amount or a minimum timing adjustment amount of the first node in a unit of time.

16. The timing apparatus according to claim 13, wherein the processor is further configured to reconfigure a timing reference signal of the first node; and wherein the transceiver is further configured to receive a second network timing advance sent by the first node.

* * * * *

UNITED STATES PATENT AND TRADEMARK OFFICE
CERTIFICATE OF CORRECTION

| | | |
|---|---|---|
| PATENT NO. | : 11,671,931 B2 | Page 1 of 1 |
| APPLICATION NO. | : 17/094341 | |
| DATED | : June 6, 2023 | |
| INVENTOR(S) | : Liu et al. | |

It is certified that error appears in the above-identified patent and that said Letters Patent is hereby corrected as shown below:

In the Claims

In Column 34, in Claim 1, Line 21, delete "$T_c$," and insert -- $T_c$ --, therefor.

In Column 34, in Claim 1, Line 24, delete "$B*T_C$," and insert -- $B*T_c$, --, therefor.

In Column 35, in Claim 5, Line 6, delete "$T_c$, $T_c$," and insert -- $T_c$, $T_c$ --, therefor.

In Column 35, in Claim 5, Line 10, delete "$B*$," and insert -- $B*T_c$, --, therefor.

In Column 36, in Claim 10, Line 7, delete "requests" and insert -- request requests --, therefor.

In Column 36, in Claim 13, Line 40, delete "$T_c$, $T_c$," and insert -- $T_c$, Tc --, therefor.

Signed and Sealed this
Eighth Day of August, 2023

*Katherine Kelly Vidal*

Katherine Kelly Vidal
*Director of the United States Patent and Trademark Office*